(12) United States Patent
Lee et al.

(10) Patent No.: US 8,574,677 B2
(45) Date of Patent: Nov. 5, 2013

(54) LAYER-BY-LAYER FABRICATION METHOD OF SPRAYED NANOPAPER

(76) Inventors: James L. Lee, Columbus, OH (US);
Dante Guerra, Columbus, OH (US);
Yong G. Min, New Albany, OH (US);
Siva Movva, Hillsboro, OR (US)

( * ) Notice: Subject to any disclaimer, the term of this patent is extended or adjusted under 35 U.S.C. 154(b) by 173 days.

(21) Appl. No.: 13/106,047

(22) Filed: May 12, 2011

(65) Prior Publication Data
US 2011/0281034 A1 Nov. 17, 2011

Related U.S. Application Data

(60) Provisional application No. 61/344,050, filed on May 12, 2010.

(51) Int. Cl.
*B05D 3/00* (2006.01)
(52) U.S. Cl.
USPC .......................................................... 427/294
(58) Field of Classification Search
None
See application file for complete search history.

(56) References Cited

U.S. PATENT DOCUMENTS

2006/0166003 A1* 7/2006 Khabashesku et al. ....... 428/413

FOREIGN PATENT DOCUMENTS

WO    WO 2008030474 A2 *  3/2008

OTHER PUBLICATIONS

Lee et al, Layer-by-Layer Assembly of All Carbon Nanotube Ultrathin Films for Electrochemical Applications, J. AM. Chem. Soc., 2009, vol. 131, p. 671-679.*
Guerra, Dante et al. "Nanoparticle Reinforced Long Fiber Composites." Department of Chemical and Biomolecular Engineering. The Ohio State University. pp. 1-20, 2009.
Guerra, Dante et al. "Novel Methods of Incorporating Nanoparticles into Fiber Preforms." *Society of Plastics Engineers Annual Technical Conference 2009.* pp. 1-7.
Guerra, Dante et al. "Novel Methods of Incorporating Nanoparticles into Fiber Preforms." Presentation. The Ohio State University, Department of Mechanical Engineering. pp. 1-29. 2009.
Movva, Siva et al. "Improving the Thermal Conductivity of Epoxy Hybrid Nanocomposites for Aerospace Applications."
Zhou, Gang et al. "Preparation and Properties of Nanoparticle and Long Fiber Reinforced Thermoset Composites." The Ohio State University, Department of Chemical and Biomolecular Engineering. pp. 1-5, 2006.
Zhou, Gang et al. "Preparation, Structure, and Properties of Nanoparticles and Long Fibers Reinforced Thermoset Composites." Department of Chemical and Biomolecular Engineering, Department of Mechanical Enineering at The Ohio State University. pp. 1-35, 2006.

* cited by examiner

*Primary Examiner* — Dah-Wei Yuan
*Assistant Examiner* — Nga Leung V Law
(74) *Attorney, Agent, or Firm* — Huffman Law Group, P.C.

(57) ABSTRACT

A layer-by-layer fabrication method of sprayed nanopaper is disclosed in the present invention. According to one embodiment, a plurality of nano-micro particles are suspended in a solvent to form a sprayable particle precursor. Afterwards, one or more sprayed nanopapers are formed by vacuum-assisted layer-by-layer spray of the sprayable particle precursor on a porous substrate.

8 Claims, 20 Drawing Sheets

LAYER-BY-LAYER FABRICATION METHOD OF SPRAYED NANOPAPER

CROSS REFERENCE TO RELATED APPLICATIONS

This application claims the benefit of U.S. Provisional Application No. 61/344,050 filed May 12, 2010.

BACKGROUND OF THE INVENTION

1. Field of the Invention

The present invention relates to nanoparticle formed papers and nanoparticle deposition into fiber mats/preforms, their polymeric composites, and methods of their production and articles made therefrom.

2. Description of the Prior Art

With the soaring cost of fuels and other energy sources, innovative light weight materials that can provide high structural strength for aerospace, energy, transportation, and construction applications will benefit from a rapidly expanding market. Nanomaterials, and in particular, nanoparticle reinforced composites are one of the best solutions for these applications. The market potential of nanomaterials is enormous and Business Week recently stated that current products containing nanomaterials were valued at $26.5B. Nanotechnology is projected to have a $1 trillion impact on the U.S. economy by the year 2015.

Polymer/nanoparticle composites have been extensively studied since the 1990s. Because of the nanoscale dispersion and high aspect ratio of nanoparticles, polymer nanocomposites exhibit light-weight, dimensional stability, heat and flame resistance, barrier properties, and improved modulus and strength with far less reinforcement loading than conventional composites. While nanoparticles reinforce the polymer matrix, the loading of nanoparticles in polymer nanocomposites is often limited due to dispersion issues. Thus, mechanical properties of polymer nanocomposites are relatively low compared with those of highly loaded conventional fiber-reinforced plastics (FRPs with fiber loading >50 wt. %).

Over the last 15 years, substantial R&D efforts have been directed to develop methods that can prepare well-dispersed nanoparticles to form high performance nanocomposites. Approaches to incorporating nanoparticles into composite materials include premixing nanoparticles into a thermoplastic polymer matrix to form compounded pellets and forming a pre-preg thin film using a thermoset polymer resin. These approaches provide a relative improvement in properties over unmodified materials, but are limited to low nanoparticle loading and poor control of nanoparticle dispersion. For thermoset pre-pregs, limited shelf life is also a major drawback.

In recent years, researchers have developed ways to prepare nanoparticle thin films/papers but most of them are applicable only to carbon nanotubes (CNTs), i.e. 'buckypaper'. Some use a paper making process, via the filtration of CNT suspensions in water or an organic solvent and then drying the resulting slurry; while others use more sophisticated fabrication methods such as Chemical Vapor Deposition (CVD), spin coating, drop casting, dip casting, and Langmuir-Blodgett deposition of nanoparticle suspension. All these methods have limitations such as high cost, poor film homogeneity and uniformity, low production rate and/or difficulty in dimensional control. There is significant market demand for a low-cost and mass-producible method that can produce high performance nanoparticle films/papers containing single or multiple nanoparticles to meet the requirements for safe nanomaterial handling and numerous industrial applications.

Fiber reinforced plastic (FRP) is the most widely used composite. In general, fibers are the principal load carrying members while the surrounding matrix keeps the fibers in the desired location and orientation and acts as a load transfer medium. Fiber reinforced plastics have low specific gravity, a high strength-to-weight ratio, and a high modulus-to-weight ratio. Fiber-reinforced plastics have good in-plane mechanical properties, determined by the reinforcing fibers, but the properties in the transverse and thickness directions defined by the characteristics of the matrix resin are much weaker. Under tension, compression, shear, or impact, failure of the polymer matrix may take place. It is highly desirable to incorporate nanoparticles into FRPs to remedy the aforementioned drawbacks. However, there aren't any low-cost fabrication methods that can bring the nanoparticles and FRPs together efficiently. Pre-mixing nanoparticles into the polymeric resins tends to increase the resin viscosity leading to long mold filling time in composite molding. Nanoparticles may also be filtered out by the fiber reinforcement causing non-uniform nanoparticle distribution in the molded composite.

Thermal and electric conductivities of composites are important properties for many structural applications. Next generation aerospace structures and wind blades could use more thermally and electrically conductive materials to judiciously direct heat flow and provide EMI shielding. The inherent poor thermal and electric conductivity of polymer composites, which are widely used in aerospace and wind blade structures, is not efficient in these applications. Many nanomaterials have been explored as candidates for improving the thermal and electric conductivity of polymer composites, including carbon nanotubes (CNTs) and carbon nanofibers (CNFs).

SUMMARY OF THE INVENTION

In view of the foregoing, it is an object of the embodiment of the present invention to provide a novel fabrication method of sprayed nanopaper.

According to one embodiment, a plurality of nano-micro particles are suspended in a solvent to form a charged or non-charged sprayable particle precursor. Afterwards, one or more sprayed nanopapers are formed by vacuum-assisted layer-by-layer spray of the sprayable particle precursor on a porous substrate, which can be a part of nanopaper.

BRIEF DESCRIPTION OF THE DRAWINGS

The present disclosure can be described by the embodiments given below. It is understood, however, that the embodiments below are not necessarily limitations to the present disclosure, but are used to a typical implementation of the invention.

DESCRIPTION OF THE PREFERRED EMBODIMENTS

Figure 1:
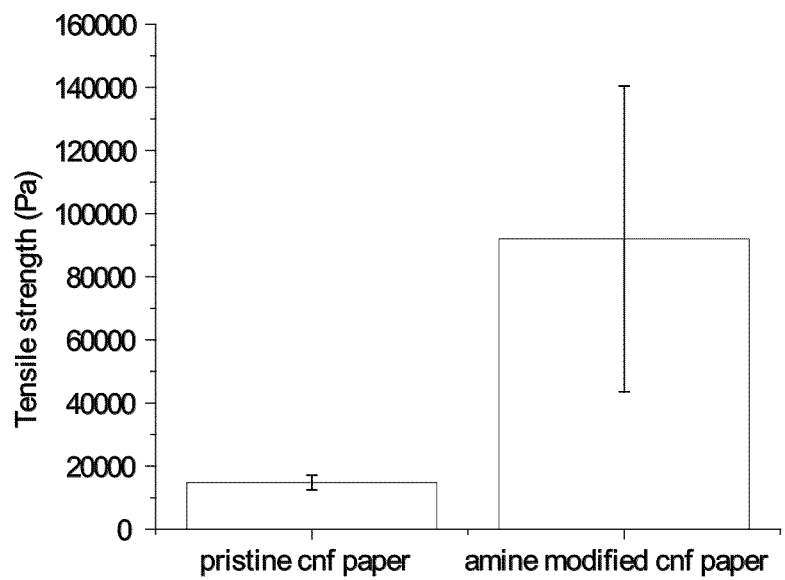
FIG. 1 graphically illustrates tensile strengths and moduli of unmodified and amine modified CNF nanopapers.
Figure 1:
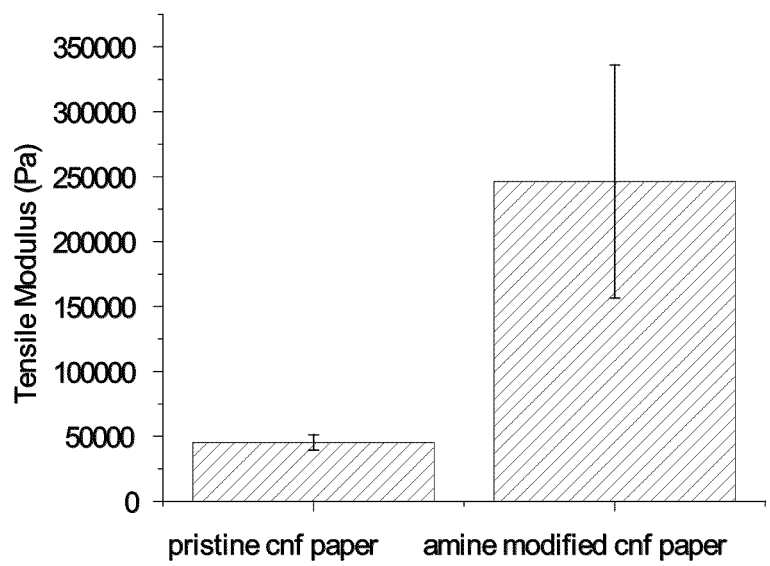

What probed into the invention is a layer-by-layer fabrication method of sprayed nanopaper. Detailed descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater details in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

The present invention is related to the development of an affordable technology to combine the advantages of FRPs and polymer nanocomposites. The goal is to produce a low-cost superior composite, with light weight and high thermal/electric management capability, using long/continuous fibers with nanoparticle reinforcements. Long or continuous fibers can provide good mechanical properties in composites while nanoparticles may strengthen the matrix between the long fibers and reduce matrix failure. This should extend the material longevity and provide good thermal/electric management to enhance the conductivity in the lateral (out-of-plane) direction. The invented method can also produce multifunctional nanoparticle films or nanopapers with either mixed or alternating nanoparticle layers from less than one to 1,000 μm thick. This control over structure allows the nanopaper to perform optimally in any desired application such as wear resistance, electrical conductivity, thermal conductivity, EMI shielding, electrostatic discharge, etc.

One major advantage of nanopaper according to this invention is its high strength and integrity as well as its compatibility with any resin matrix as well its infinite shelf life.

The invented fabrication process consists of three steps: (1) surface modification of nanoparticles to add chemical functionality and electrostatic charge for better particle dispersion in solvent, stronger and more stable nanopaper, enhanced resin curing, and improved composite strengths and surface functionality; (2) vacuum-assisted layer-by-layer nanoparticle spraying technique for low-cost and high-speed formation of nanopapers and deposition of nanoparticles into fiber mats and preforms with desirable nanoparticle mixture and layer-by-layer structure; and (3) molding of nanopaper or nanoparticle reinforced long- or continuous fiber composites using pre-pregs or fiber preforms with epoxy, vinyl ester, unsaturated polyester, phenolic or other polymer resins for improved composite strength, surface wear resistance, and electric/thermal conductivity.

One preferred embodiment according to this specification discloses a fabrication method of sprayed nanopaper. The mentioned method according to this specification comprises a process of suspending a plurality of nano-micro particles in a solvent to form a sprayable particle precursor, and a process of forming one or more sprayed nanopapers by vacuum-assisted layer-by-layer spray of the sprayable particle precursor on a porous substrate. In this text, the term "nano-micro particles" refers to "nanoscale or microscale particles and their mixture."

According to this embodiment, the sprayable particle precursor comprises the nano-micro particles and the solvent. The nano-micro particles are suspended in the solvent. The nano-micro particles comprise one or any combination selected from the group consisting of carbon nanofibers, carbon nanotubes, clays, graphites, graphenes, polymer fibers, para-aramid synthetic nanofibers (such as Kevlar® nanofibers), diamonds, ceramic particles, metal, metal oxide and metal alloy particles. The mentioned solvent comprises one or any combination selected from the group consisting of water, ethanol, acetone and other organic solvent.

In one preferred example of this embodiment, the nano-micro particles can be functionalized by amine containing materials. The mentioned amine containing materials comprise one or any combination selected from the group consisting of polyethyleneimine (PEI), polyaniline and related amine containing molecules and polymers.

In another preferred example of this embodiment, the nano-micro particles can be treated by amine and/or acid containing materials to make the surface of the nano-micro particles positively and negatively charged.

According to this embodiment, in one preferred example of this embodiment, the sprayed nanopaper comprises one or more types of nano-micro particles. For example, the sprayed nanopaper consists of a single type of nanoparticles or microparticles, or the nanopaper consists of a mixture of two or more types of nanoparticles or microparticles.

In another preferred example of this embodiment, the sprayed nanopaper comprises a layer-by-layer structure of one or more types of nano-micro particles. In addition, the nano-micro particles can be applied with alternating positive or negative surface charges. For example, the sprayed nanopaper consists of a layer-by-layer structure of a single type of nanoparticle or microparticle with alternating positive or negative surface charges or, the sprayed nanopaper consists of a layer-by-layer structure of two or more types of nanoparticles or microparticles, wherein the sprayed nanopaper consists of a layer-by-layer structure of two or more types of nanoparticles or microparticles with alternating positive or negative surface charges.

In still another preferred example of this embodiment, the sprayed nanopaper is formed by a batch or continuous spray method with or without a roll system.

In one preferred example of this embodiment, the sprayed nanopaper is placed on one side or both sides of a prepreg stack and molded into a nanopaper reinforced polymeric composite by various composite molding processes.

In another preferred example of this embodiment, the sprayed nanopaper is placed on one side or both sides of a fiber mat stack or a fiber preform and molded into a nanopaper reinforced polymeric composite by various composite molding processes.

In still another preferred example of this embodiment, the sprayed nanopaper is placed on one or more than one fiber mat stack surfaces and the fiber mat stack is molded into a nanopaper reinforced polymeric composite by various composite molding processes.

In one preferred example of this embodiment, the sprayable particle precursor is incorporated into long- or continuous fiber mats/preforms, other porous substrates or their combinations, wherein the sprayable particle precursor incorporated into other porous substrates comprises one or any combination selected from the group consisting of woven and non-woven polymer and non-polymer fabrics, glass fiber veil and carbon fiber veil. For example, the sprayable particle precursor is incorporated into long- or continuous fiber mats or preforms, or the sprayable nanoparticle precursor is incorporated into other porous substrates including, but not limited to, woven and non-woven fabrics, glass fiber veil, carbon fiber veil, etc. In the above mentioned examples, the nano-micro particles are incorporated into long- or continuous fiber mats/preforms, other porous substrates or their combinations and are molded into a nano-micro particle reinforced polymeric composite by various composite molding processes.

Surface Modification of Nanoparticles

Our nanoparticles and nanopapers are designed for use in various polymer composite applications. Based on the type of matrix resin, the nanoparticle surface may need to be tailored accordingly. For high performance applications, epoxy is the most widely used polymer matrix. Amines are typically the curing agents for the cross-linking reaction of epoxy. Therefore, amine functionalization of nanoparticles is an excellent choice because amine not only enables the formation of a strong covalent bond between the polymer matrix and the nanoparticles but also allows nanoparticles to be well dispersed in water and form strong electrostatic bonding with other nanoparticles in the nanopaper formation process. Our results show a 60% increase of flexural strength of CNF/epoxy nanocomposites. The stand-alone nanopaper properties are also improved significantly due to surface modification of the nanoparticles. For example, the tensile strength of the amine modified CNF paper was almost 8 times higher than that of unmodified CNF paper and the tensile modulus of the amine modified CNF paper was 6 times higher than that of the unmodified CNF paper as shown in FIG. 1 and Table 1. The amine modified CNT and CNF nanopapers had a much higher flexural strength, thus improving their handling stability over the unmodified papers. This in turn increases the process safety.

TABLE 1

Tensile strengths and moduli of unmodified and amine modified CNF nanopapers

| Test | Unmodified CNF paper | PEI modified CNF paper | % Improvement |
| --- | --- | --- | --- |
| Breaking Strength (Pa) | 14,789 | 92,000 | 520% |
| Tensile Modulus (Pa) | 45,328 | 246,289 | 440% |

Several different amine functionalization techniques have been developed, including oxidation/acylation and eventual amine functionalization of nanoparticles, direct Friedal crafts reaction to form amine groups on nanoparticles, and the use of polyelectrolytes such as polyethyleneimine (PEI) to form charged amine complexes on nanoparticles. In the latter method, CNTs/CNFs are reacted with polyethyleneimine (PEI) in a reaction medium like dimethylformamide (DMF) at a specific temperature and for a specific period of time to obtain CNTs/CNFs with primary, secondary and tertiary amines on their surfaces. These amine groups take up a positive charge in a solution with neutral pH like water, and this helps in separating nanoparticles and achieving uniform dispersion. It was found that a polyamine surface modified nanoparticle resulted in faster curing and high conversion yield of epoxy, vinylester and unsaturated polyester resins at low temperatures. This is very important for the fabrication of large structure composites.

Chemical functionalization of CNFs and CNTs by strong acids tends to reduce the high aspect ratio of the nanoparticles. In the direct Friedal Crafts amidation reaction of CNFs, amine benzoic acid was used to incorporate aromatic amines onto the CNFs surface. A significant length reduction of CNFs is observed. On the other hand, a 'soft' surface modification method using PEI in water didn't damage any CNFs. There are also different amines that can be used for nanoparticle surface functionalization in epoxy composites. They vary in structure (linear vs. branched), molecular weight (high vs. low), and type of amine (primary, secondary, or tertiary). While primary and secondary amines react directly with epoxy to form a strong covalent bond between the CNF/CNT and the matrix epoxy, tertiary amines act as catalysts for the cure reaction. Molecular weight of the polyamines is also an important consideration for the end surface chemistries. In addition to CNF and CNT, this surface modification method is applicable to other nano- or microparticles such as clay, graphite and graphene.

Polyaniline (PANI) grown on nanoparticles is another way to add amine functionality to nanoparticle surface. As an example, FIG. 9B shows more than 100 times improvement of the CNF nanopaper tensile strength when CNF was treated with PANI. The cure behavior of an epoxy resin showed that PANI surface modified CNFs substantially increased the reaction rate and the conversion of the resin. Using different amino end-capped and branched polyaniline and the polyaniline-based aromatic amines may further improve the epoxy resin curing and enhance the composite performance compared to the conventional aliphatic amine curing agents.

Another valuable surface modification is the epoxide functionalization. The epoxide group has a very rich chemistry and can be converted into other functionalities through its ring opening reaction for enhanced interfacial bonding and good particle dispersion. In addition to CNF and CNT, this surface modification method is applicable to other nano- or microparticles such as clay, graphite and graphene.

The Spray Technique

The initial approach is to disperse nanoparticles in organic solvents by means of ultrasonic forces. Although this spray technique was able to achieve good nanoparticle dispersion as well as deposit an even network of nanoparticles on the fiber preform surface, it created a cloth-like layer on the surface of each fiber preform. Consequently, this method will lead to a non-uniform composite where there is a clear boundary between a long fiber reinforced phase and a nano-reinforced resin rich area. Mechanical property testing has shown reduced overall mechanical properties of this layered structure.

Figure 2:
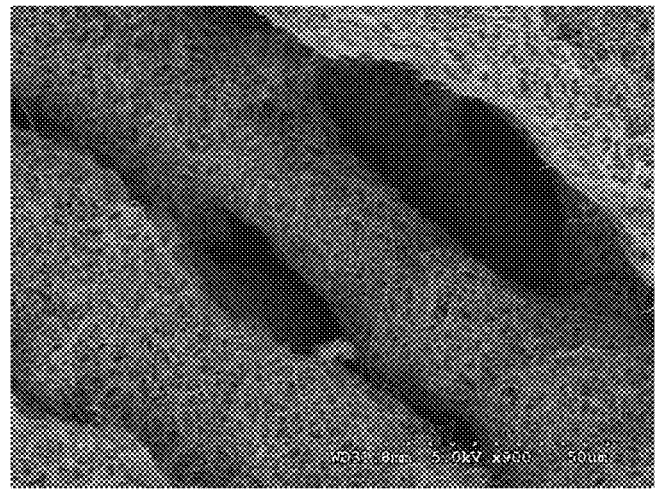
FIG. 2 shows scanning electron microscope (SEM) images of CNF covering individual glass fiber strands after the Vacuum Assisted Spray Technique (VAST) nanoparticle incorporation.
Figure 2:
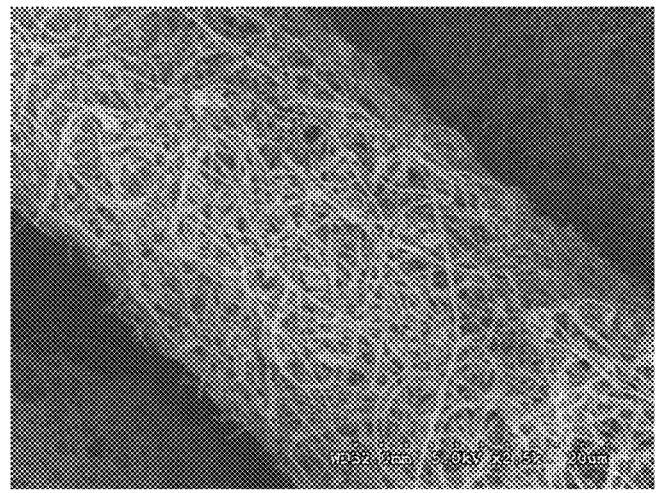
Figure 3A:
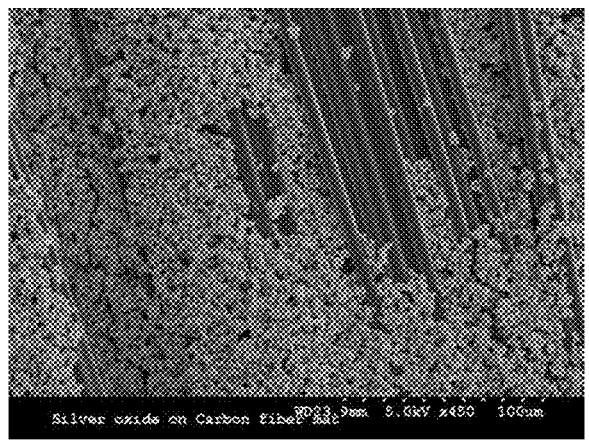
FIG. 3A shows a SEM image of silver oxide nanoparticles.
Figure 3B:
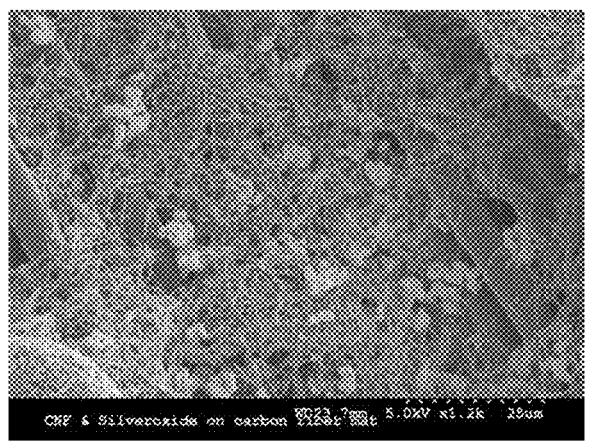
FIG. 3B shows a SEM image of CNF and silver oxide nanoparticles.
Figure 3C:
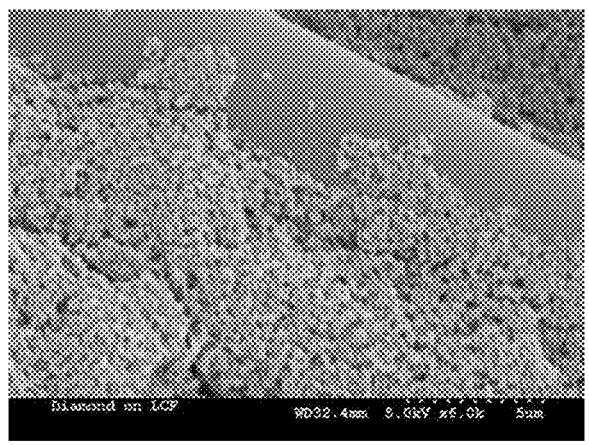
FIG. 3C shows a SEM image of diamond nanoparticles on a CNF fiber mat surface.

It is desirable to incorporate nanoparticles into the fiber preform to prevent the layering effect. A new spray technique was developed to achieve this goal by means of air flow generated by a pressure difference. This vacuum assisted spray technique (VAST) achieved excellent nanoparticle dispersion and incorporation into the fiber preform, to the extent of being able to wrap individual long fibers with a network of CNFs as shown in FIG. 2. This vacuum assisted spray technique can be used to disperse a variety of nanoparticles as shown in FIGS. 3A, 3B and 3C where nanoparticles of diamond and silver oxide and CNFs were dispersed uniformly in glass or carbon fiber mats.

After comparison of both pre-mixing and pre-spray approaches, the following advantages of the pre-spray approach are observed: (1) It can overcome the major manufacturing hurdle of handling nanoparticle-filled high viscosity resins. (2) The vacuum assisted spray technique (VAST) is a simple method to add nanoparticles to long-fiber preforms. It can be easily implemented by adding a high pressure air compressor with a high pressure spray gun. (3) VAST is a "drop-in" process for the remainder of composite processing (no additional equipment and no changes to manufacturing conditions).

In order to enhance the molecular interactions between nanoparticles, a multilayer self-assembling process was developed in our spraying process through "positive" and "negative" electrostatic bonding. Both "positive" and "negative" charged nanoparticles can be pre-treated and/or pre-functionalized using our surface modification techniques. These functionalized nanoparticles are applied through spray of alternate "positive" and "negative" charged nanoparticle layers. Self-assembling multilayer nanopapers are made through this process as shown in FIG. 4A and FIG. 4B.

Figure 4A:
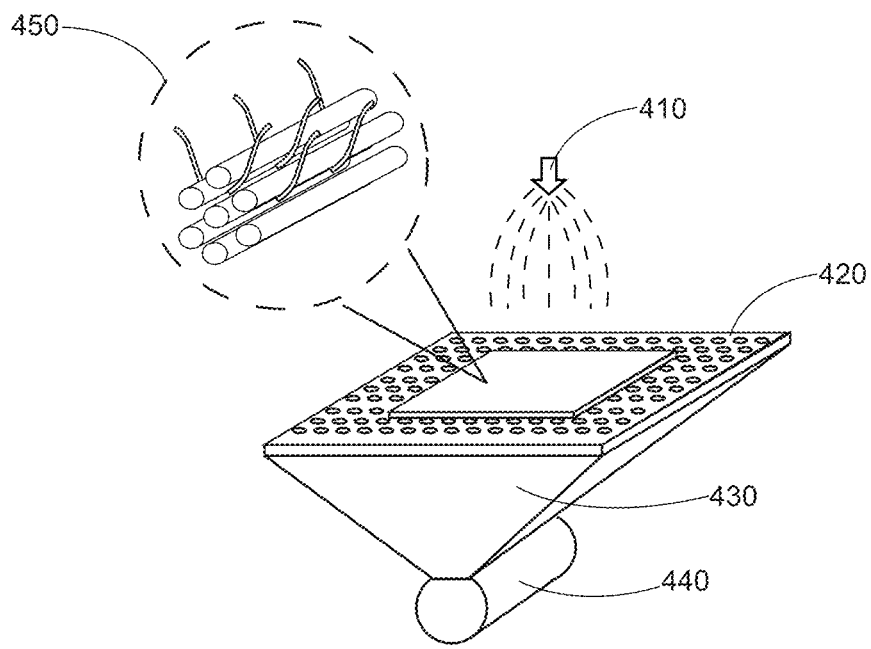
FIGS. 4A and 4B illustrate a Vacuum Assisted Spray Technique (VAST)
Figure 4B:
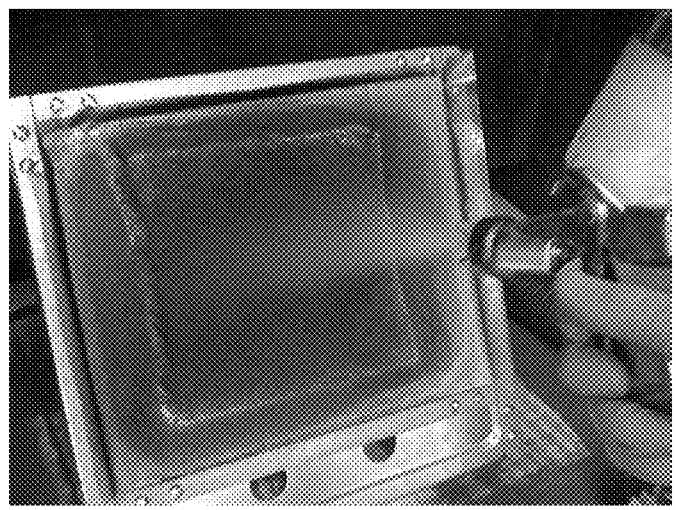

Referring to FIG. 4A, the schematic of VAST, the nanoparticles are sprayed from a spray nozzle 410 toward a fiber mat support 420. The fiber mat support 420 is set on a funnel 430, and the fiber mat support 420 is porous. The funnel 430 is connected with a vacuum pump 440. According to this invention and as shown in the reference number 450 in FIG. 4A, CNF's being pulled into fiber tow by vacuum force. As shown in FIG. 4A, a picture of VAST is presented.

Figure 5:
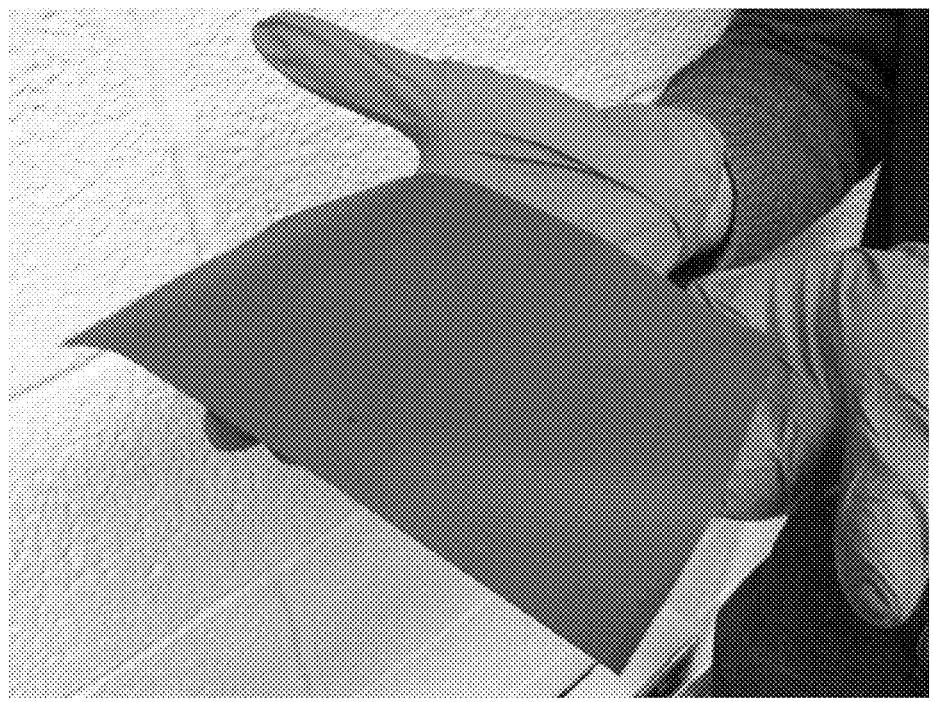
FIG. 5 shows a photographic image of a free-standing CNF nanopaper with 12"×12" dimensions.
Figure 6:
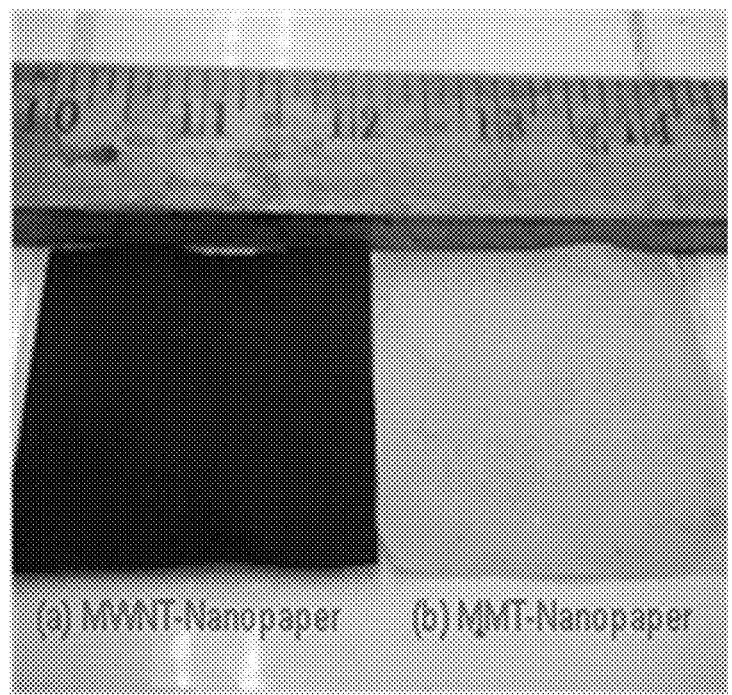
FIG. 6(a) photographically illustrates a nanopaper made of CNT, and FIG. 6(b) photographically illustrates a nanopaper made of nanoclay.
Figure 7:
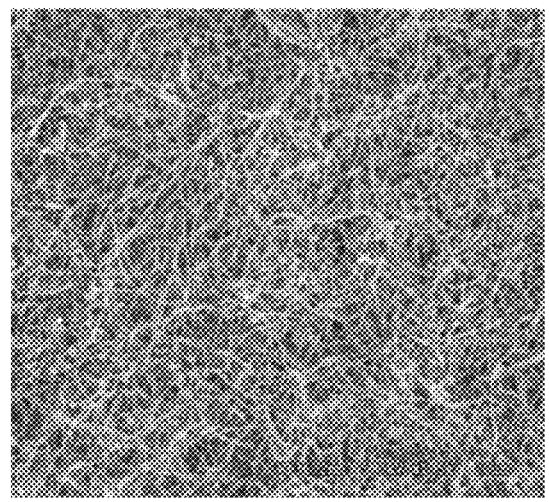
FIG. 7 shows a SEM image of CNF dispersion on a nanopaper surface.

This technology can be applied to either single or multiple nanoparticles, as well as a mixture of several of them. FIG. 5 shows a VAST-formed CNF nanopaper, while FIG. 6 shows VAST-formed CNT and nanoclay nanopapers. FIG. 7 shows that nanoparticles (CNF in this case) are well dispersed in the nanopaper.

Figure 8A:
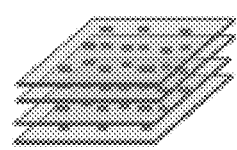
FIG. 8A illustrates formation of hybrid nanopaper from "negative charges" of nanoclay.
Figure 8B:
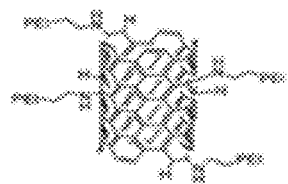
FIG. 8B illustrates formation of hybrid nanopaper from "positive charges" of CNT-PEI, and FIG. 8C photographically illustrates formation of a hybrid nanopaper from SEM morphology of a hybrid nanopaper with an alternative layered structure.
Figure 8C:
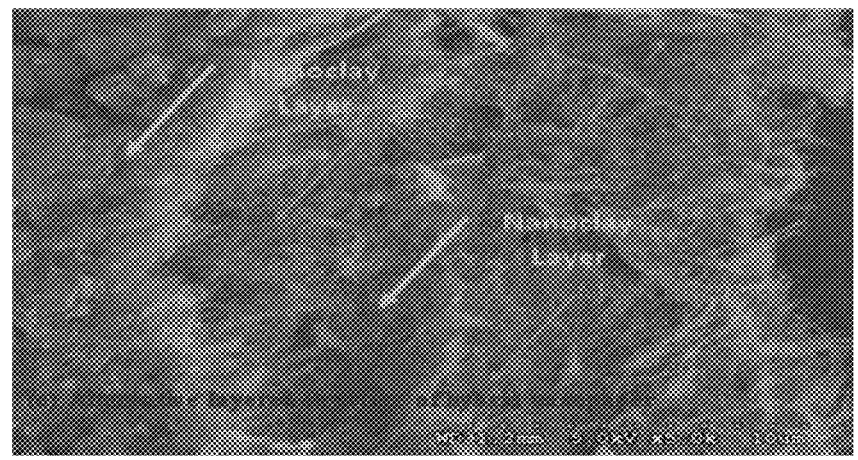

FIGS. 8A, 8B and 8C show the SEM picture of a CNT-nanoclay multi-layered nanopaper. The advantages of hybrid nanopapers are the leverage on the nanoparticles' properties and synergy on nanopaper performance. For example, the plate-like nanoclay or graphene is good for wear resistance and gas/fluid diffusion barrier applications, while CNTs and CNFs can provide good electric conductivity. Cost reduction is another advantage of this approach. For some applications such as EMI shielding and antistatic applications, a low content of CNTs or CNFs may be sufficient to achieve the desired electric conductivity in the hybrid nanopapers. Additionally, the more expensive CNTs and CNFs can be replaced by low-cost graphites depending on the particular industrial applications. The surface property of nanoparticles has been successfully modified to facilitate dispersion and electrostatic bonding in the nanopaper spray process and to enhance resin curing and composite strength in the molding process.

The charged nanoparticles and particularly the 'layer-by-layer' alternating addition of positively and negatively charged nanoparticles can greatly enhance the mechanical strength of formed nanopapers. This is clearly demonstrated in FIG. 9A and FIG. 9B, particularly when the particles were treated by PANI.

Figure 9A:
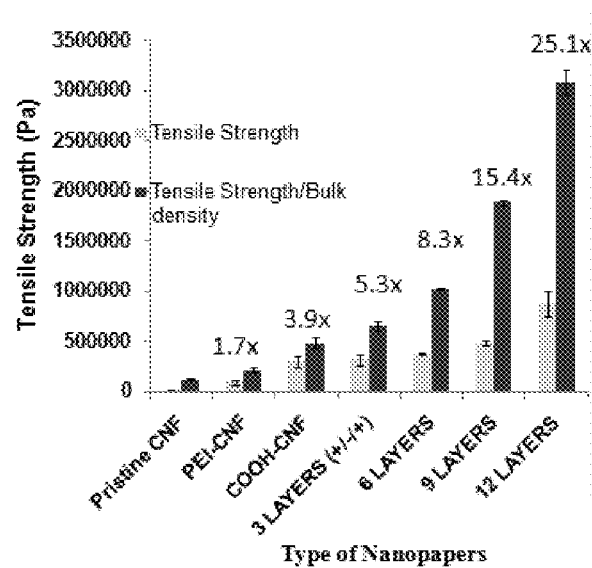
FIG. 9A graphically illustrates tensile strength and normalized tensile strength (i.e. tensile strength divided by nanopaper density) of various nanopapers made of PEI- and acid-treated CNFs, and FIG. 9B graphically illustrates tensile strength and normalized tensile strength of various nanopapers made of doped (positively charged)- and de-doped (negatively charged) polyaniline treated CNFs by the layer-by-layer method.
Figure 9B:
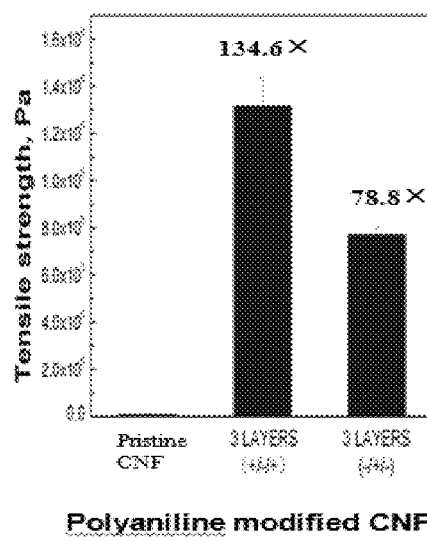

FIG. 9A shows increased tensile strength and tensile strength/bulk density (normalized tensile strength) by increasing layers of deposition, and FIG. 9B shows increased (134.6×) tensile strength of 3-layer nanopaper by using polyaniline modified carbon nanofibers.

Nanopaper made from polyaniline treated CNF is enhanced in mechanical properties and electric conductivity: it is found that the layer-by-layer technology can dramatically enhance the mechanical performance, which will be very critical on material handling and customer usage. As shown in FIG. 9A, both tensile strength and tensile strength/bulk density (normalized tensile strength) have been increased by increasing layers of deposition. Recently, it is found that the conducting polymer modified carbon nanofibers can enhance the tensile strength even further. As shown in FIG. 9B, the tensile strength of a 3-layer (+/−/+structure) nanopaper has its tensile strength increased by 134.6× by using polyaniline modified carbon nanofibers. Correspondingly, the conductivity of such nanopaper has also increased about one order of magnitude (see Table 5: +CNF/−CNF/+CNF*), which is consistent with the enhancement in the interactions between the "+" and "−" charges of conducting polymer chains.

Our solution spray process for nanopaper formation provided a >10 times higher production rate than any existing methods. Nanoparticles were first mixed in a solvent such as deionized water (a preferred choice), ethanol-deionized water mixture or acetone depending on the particle's hydrophobicity/hydrophilicity. The nanoparticle and solvent solution was then sonicated. The resulting solution was a suspension of well dispersed nanoparticles. This suspension was then sprayed onto a support substrate using a commercially available air compressor based sprayer to produce a nanoparticle paper on the support. The resulting structure and paper thickness can be affected by the rate of spray, suspension temperature, support film temperature, nanoparticle surface functionalization, and solvent selection. Poor dispersion will lead to a film with very undesirable properties due to agglomeration of nanoparticles. The spray process can be repeated with alternate nanoparticle solutions at different process parameters to create a multi-layer nanoparticle film with the desired structure and thickness for a particular application.

The substrate material used in the spray process needs to be selected carefully because it affects the quality and stability of formed nanopapers. For example, Teflon substrate is good for its non-sticky characteristics and for the ability to obtain a stand-alone nanopaper film. However, it is not suitable in cases where water is used as a solvent as Teflon is highly hydrophobic causing water de-wetting and particle agglomeration in the spray process. Nylon films, on the other hand, are good in the water process, but they do not resist high temperatures (e.g. 250° C.) used to instantly evaporate water in our high-speed spray process. Surface modified glass and ceramics are also viable choices.

Automated Sonication and Spray Process.

The use of sonication forces to disperse nanoparticles in a solution is a common and straightforward approach. However, there are many factors that can affect the resulting dispersion. The sonication equipment produces cavitations in the solution, and it is essential to have proper fluid recirculation. Other factors such as sonication time and sonication amplitude can also greatly affect the quality of the dispersion. To control the quality of the dispersed solution, an inline continuous sonication device can be used to disperse the nanoparticles in the selected solvent. This continuous sonication process allows precise control over sonication time per unit volume (by flow rate control), sonication amplitude and solution temperature.

It is important to control spray process variables because final properties depend upon uniform dispersion into the fiber preform. The use of an XY-plotter in the automated nanoparticle spray platform is developed. It allows both position and velocity control for a spray nozzle array. The spray nozzles are to be connected in-line with the continuous sonication process described earlier. This system allows for precise control of all process variables, and therefore precise control of the resulting nanoparticle structure in the sprayed fiber preforms.

Figure 10:
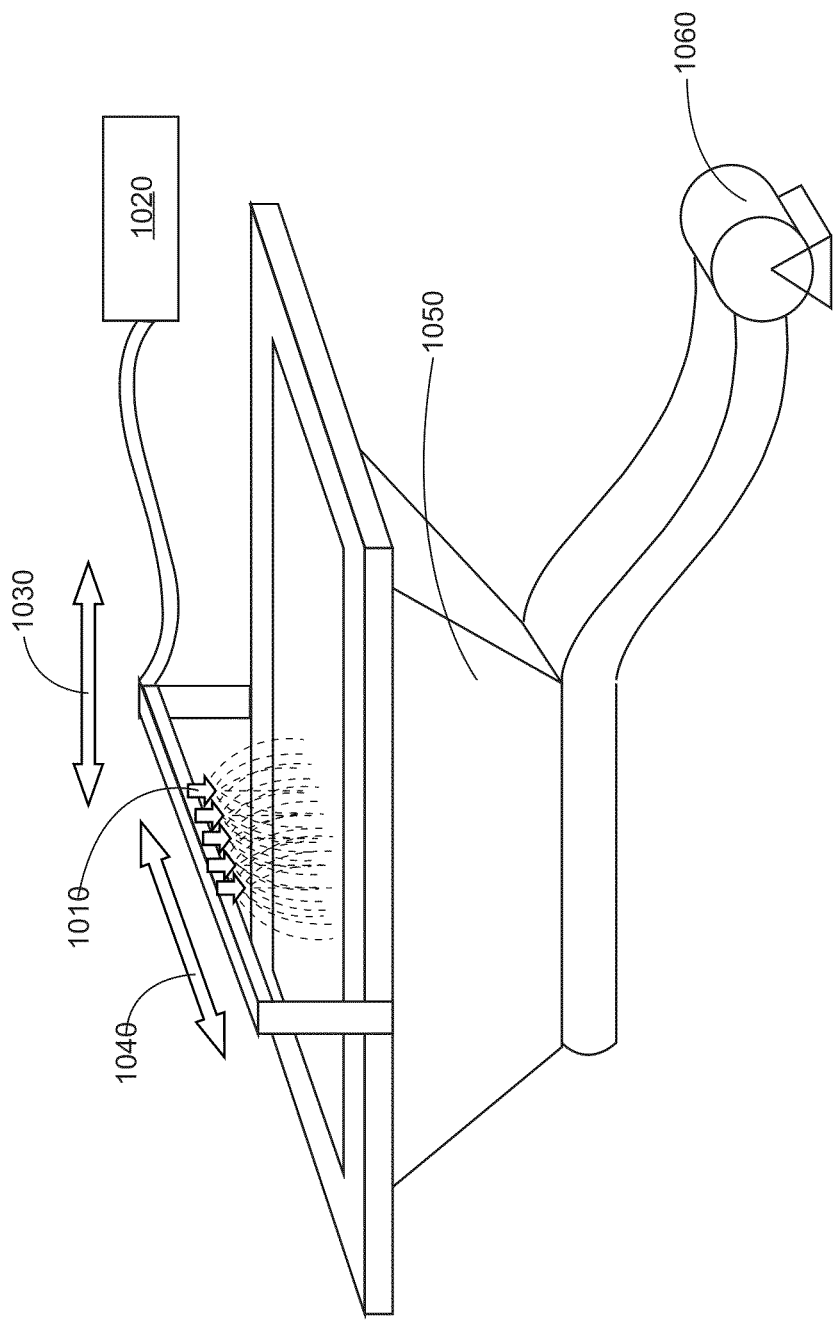
FIG. 10 schematically illustrates a XY-plotter based spray process.

A schematic of the mentioned system is shown in FIG. 10. Referred to FIG. 10, the spray nozzle array is constructed of a plurality of spray nozzles, and the spray nozzles 1010 are to be connected in-line with the continuous sonication process 1020. According to this invention, the mentioned spray nozzle array can be controlled to move in X-direction 1030 and in Y-direction 1040, so that both position and velocity of the spray process are under control.

An enclosed spray chamber 1050 is used in conjunction with the sonication and spray equipment to assure safe handling of the nanomaterials during the nanoparticle spray process. The spray chamber is connected to the laboratory ventilation system 1060, such as a vacuum pump, through a NIOSH-approved nanoparticle filtration system to avoid contamination.

Continuous Nanoparticle Spray Process

Figure 11:
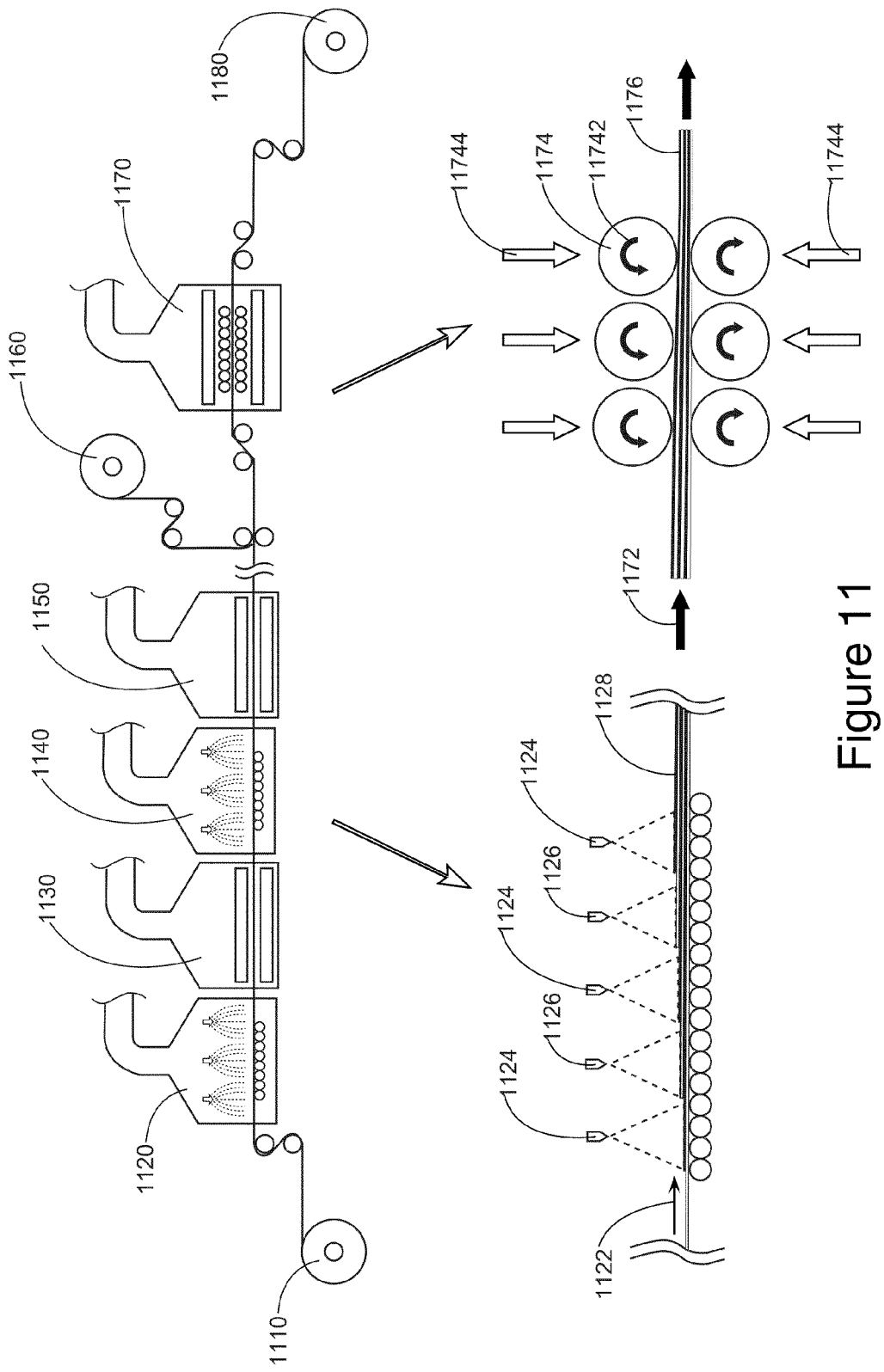
FIG. 11 shows a schematic of a continuous VAST production line for fabrication of nanopapers or nanoparticle-incorporated fiber preform.

A continuous spray process that can be scaled up to full production is shown in FIG. 11. The fiber reinforcement substrates can be continuous fiberglass or carbon fiber mat. The pre-dispersed nanoparticles are incorporated into substrates using the vacuum assisted spray technique. A heater is used to evaporate the dispersion solvent (or water) to generate the nanoparticle "pre-bound mat".

The continuous spray process can also be used to produce large size nanopapers with uniform structure and thickness. Sonication is used to maintain proper dispersion of the nanoparticle/solvent suspension. The use of an inline system allows controlled sonication of the solution to guarantee proper and uniform nanoparticle dispersion in the solution in the spray process. A sealed containment chamber is constructed to contain the whole system. This ensures that the nanoparticles as well as the solvents are contained for safety concerns as well as for waste nanoparticle recovery and recycling. An additional step in the preparation of the nanopapers is the use of a high pressure roller system. The nanopaper formed from the spray process is consolidated at different pressures to achieve different bulk densities as well as to modify the nanopaper structure.

Referring to FIG. 11, the bottom support film 1110 is sequentially transported through the first spray chamber 1120, the first oven 1130, the second spray chamber 1140, and the second oven 1150. In the first chamber 1120, multifunctional nanoparticles are sprayed to form desired thin film in a controlled manner.

In the first oven 1130, solvents are evaporated and the nanopaper is dried. In the second spray chamber 1140, polymer resins can be added as well as additional multifunctional fillers. In the second oven 1150, the polymer resins are partially or fully cured.

After the second oven 1150, the top support film 1160 is added onto the modified bottom support film. Subsequently, the combination of the top support film and the modified bottom support film is fed into a consolidation chamber 1170. In the consolidation chamber 1170, the nanoparticle film is consolidated and heated by means of heated rollers. The consolidation chamber 1170 can provide further control over thickness and structure of the nanoparticle film. After the consolidation chamber 1170, the final product 1180 is rolled and collected.

In one preferred example, as also shown in FIG. 11, the bottom support film is fed into the first spray chamber 1120 in the direction shown as the reference number 1122. In the first spray chamber 1120, there is a plurality of MWNT sprays 1124 and nanoclay sprays 1126 alternately positioned at the pathway of the bottom support film. According to the spray array in the spray chamber 1120 as shown in FIG. 11, the MWNT and nanoclay are alternately sprayed onto the bottom support film, and a multi-layered nanoparticle film 1128 is produced.

As shown in FIG. 11, in the consolidation chamber 1170, the reference number 1172 is the feeding direction of the prepared nanoparticle film into the consolidation chamber 1170. The mentioned prepared nanoparticle film is the combination of the modified bottom support film and the top support film. There is a plurality of heated rollers 1174 installed in the consolidation chamber 1170. The reference number 11742 points out the rotating direction of the heated rollers 1174. The reference number 11744 points out the pressing direction of the heated rollers 1174. When the prepared nanoparticle film passes through the heated rollers 1174, the heated rollers 1174 provide heat and pressure to consolidate the fed prepared nanoparticle film. After passing through the heated rollers 1174, the prepared nanoparticle film becomes the consolidated nanoparticle film 1176, with precise control over thickness and structure provided by the heated rollers 1174, and outputted from the consolidation chamber 1170.

Composite Molding

Our nanopapers and nanoparticle-incorporated fiber mats/performs can be applied in all composite fabrication processes. The solid type pre-preg/autoclave process and the liquid type resin transfer molding (RTM) process are two of the most important and widely used fabrication methods for advanced composite products. It has been demonstrated that our nanopapers and nanoparticle-incorporated fiber mats/preforms are applicable to epoxy, vinylester and unsaturated polyester resins.

Figure 12A:
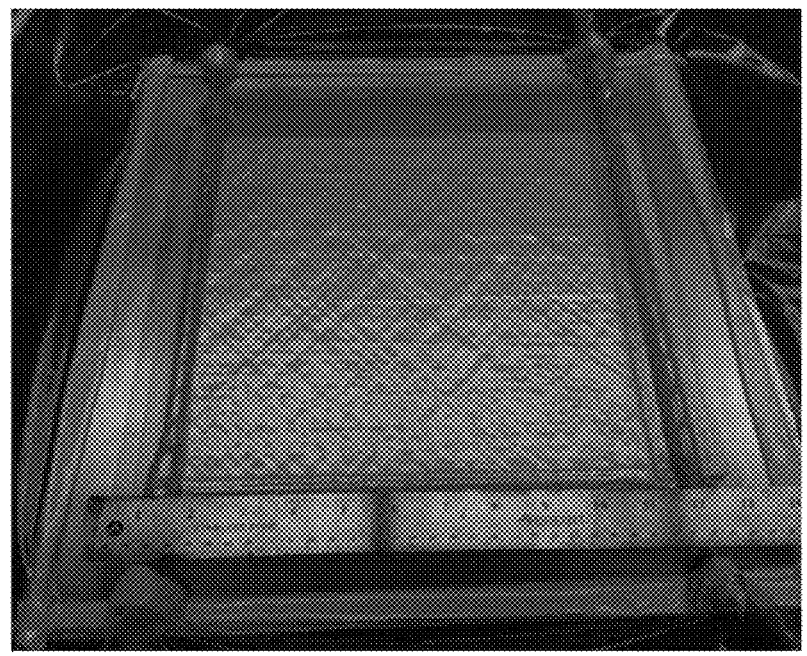
FIGS. 12A and 12B photographically illustrate vacuum assisted resin transfer molding (VARTM) or Seeman composite resin infusion molding process (SCRIMP) molding of multiple nanopapers on a bottom surface of a glass fiber reinforced epoxy composite before and during mold filling.
Figure 12B:
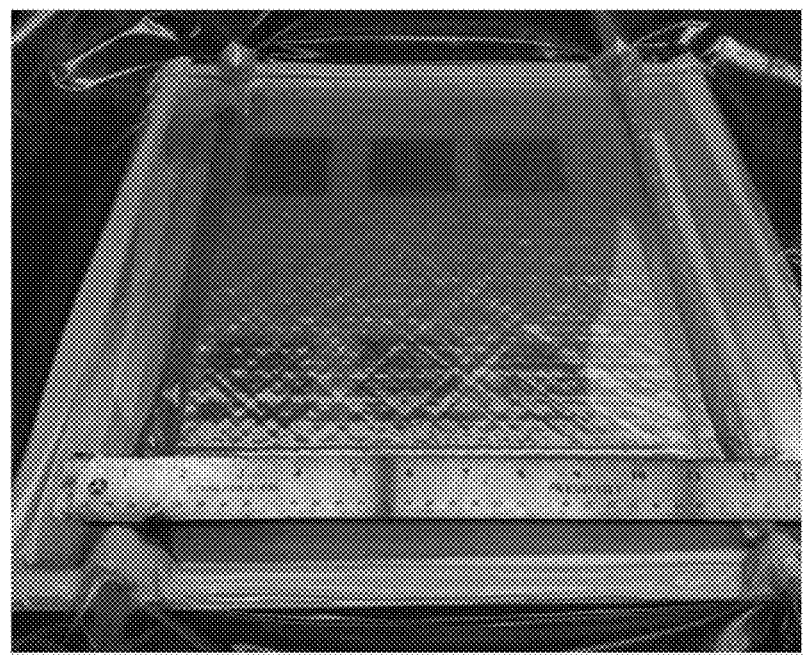
Figure 13A:
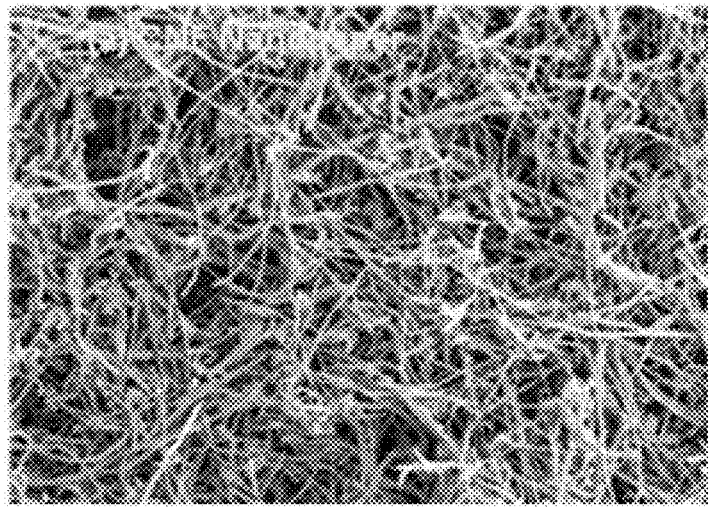
FIG. 13A shows SEM morphology of CNF nanopaper.
Figure 13B:
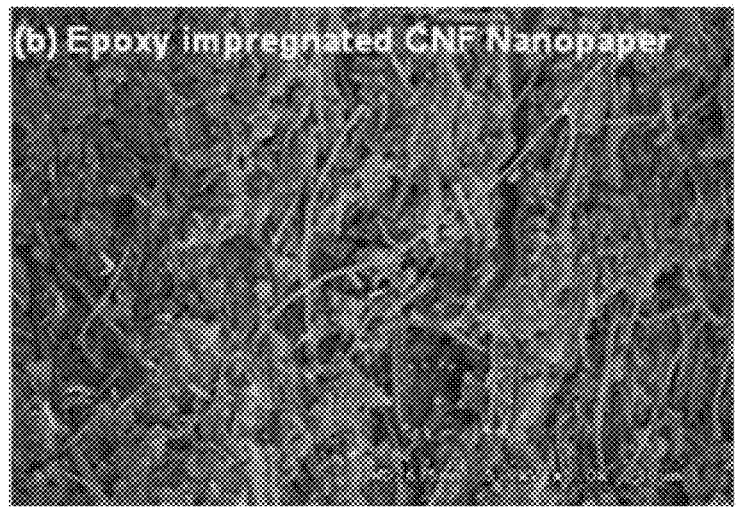
FIG. 13B shows SEM morphology of epoxy impregnated CNF nanopaper.

As an example, the Seeman composite resin infusion molding process (SCRIMP) is a low-cost vacuum assisted resin transfer molding (VARTM) technique for manufacturing large and long composite parts. It is more cost effective than the pre-preg/autoclave process and more environmentally friendly than hand lay-up or spray-up processes. SCRIMP is used to manufacture very large parts and the manufacturing time is a key factor. Thus, the mold filling time becomes extremely crucial for the economics of the process. Filling time is described as the time required for the resin to fully penetrate the reinforcing material. There is a significant effect of nanoparticles on the mold filling time. In one lab study, our nanoparticle-incorporated fiber mats caused a drop of resin permeability of almost 7 times at 1 wt. % of CNFs, which translates to 7 times longer mold filling time. However, the pre-mixing of the same amount of CNFs in the resin increased the viscosity more than 100 times, implying a 100-times-longer filling time. It is clear that our method is a much better choice for adding nanoparticles to long-fiber composites. By using different high permeable media in the molding process, the effect of nanoparticles on the filling time can be further minimized. Placing nanopapers in between individual long fiber performs can also solve the mold filling problem. FIGS. 12A and 12B show the VARTM process with several nanopapers placed on the surface of glass fiber preforms, while FIGS. 13A and 13B show that epoxy resin can fully impregnate the CNF nanopaper in the molding process.

EXAMPLE 1

CNF Reinforced Glass Fiber/Epoxy Composites Manufactured by VARTM

Figure 14:
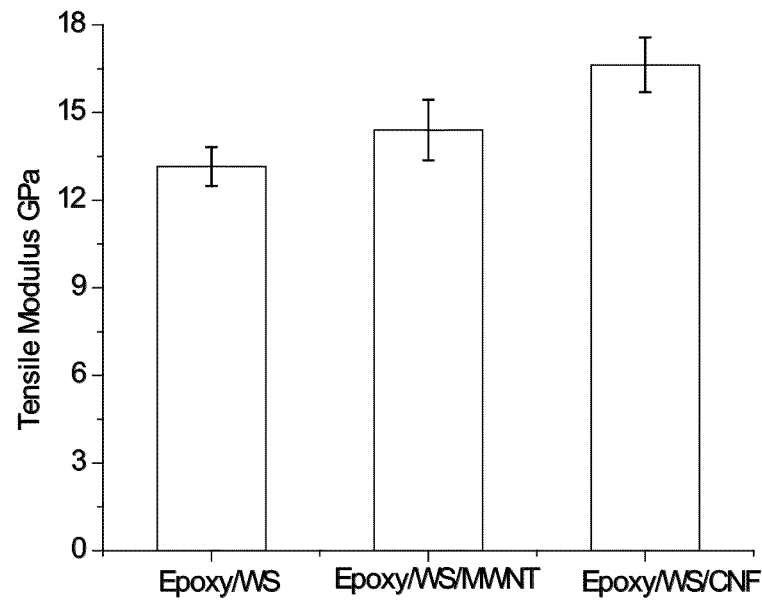
FIG. 14 graphically illustrates tensile stress and modulus improvement of Epoxy/Winstrand composite by incorporation of CNTs (0.25 wt %) and CNFs (0.3 wt %) as reinforcing agent.
Figure 14:
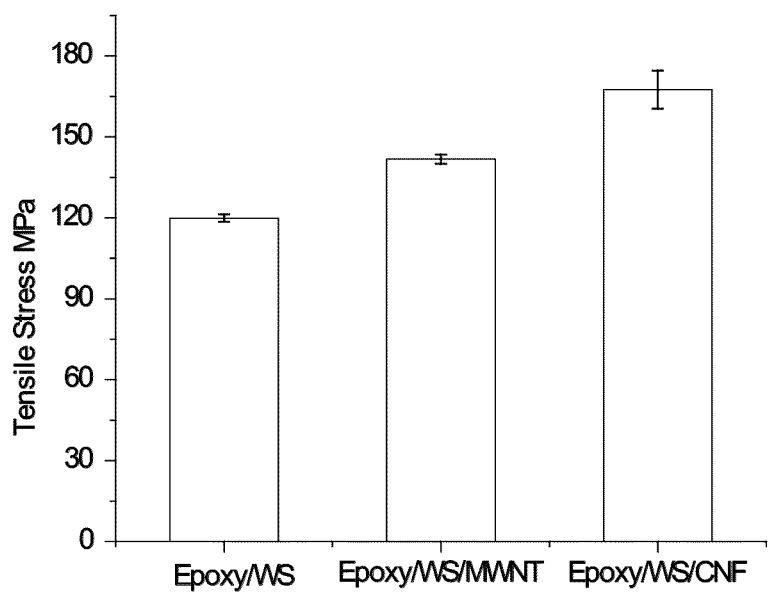
Figure 15A:
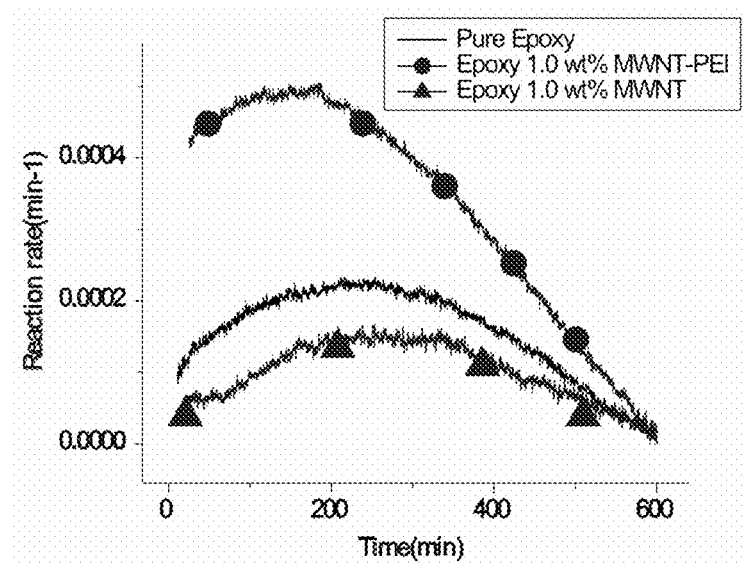
FIG. 15A graphically compares the effect of pristine and PEI grafted MWNTs on the isothermal cure reaction of epoxy at 25° C., and FIG. 15B graphically illustrates conversion profiles of epoxy and various epoxy nanocomposites after isothermal reaction at 25° C. for 10 hours.
Figure 15B:
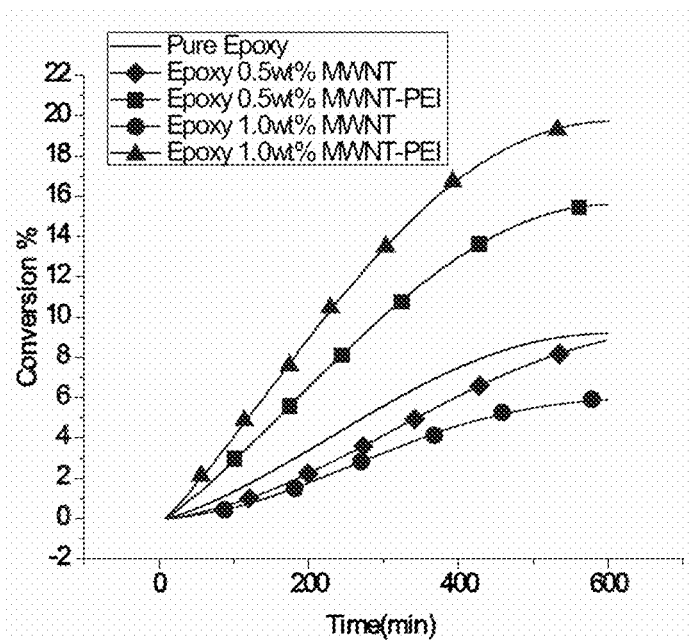

A solution of CNF (PR 24-XT-LHT-OX from Applied Science Inc.) in acetone (0.2 wt %) was sonicated for 30 min using a Branson digital sonifier at 85% amplitude, and then sprayed onto both sides of each glass fiber mat (Owens Corning WindStrand™) by our vacuum-assisted spray technique. The mats were then placed in a fume hood for solvent evaporation until the weight of the fiber mats did not decrease with time. The amount of CNF or CNT was determined by the weight difference of the fiber mat before and after spraying. Vacuum assisted resin transfer molding (VARTM) was used to impregnate the fiber preforms. Five layers of mats with pre-incorporated CNF or CNT were sealed in a vacuum bag. The inlet tube was clamped and the outlet tube was connected to a resin trap, which was connected to a vacuum pump. Before mold filling, vacuum was applied to evacuate the mold and achieve a vacuum pressure of 30 mm Hg. The epoxy resin (EPIKOTE™ RIM135) and the amine curing agent (EPIKURE™ RIM H 137) from Hexion Speciality Chemicals were degassed in a vacuum chamber for 10 min, and then were introduced into the fiber preforms. After the mold was fully filled, the inlet and outlet pipes were clamped to maintain the vacuum pressure in the mold. All samples were cured at room temperature (~25° C.) for 24 hr, and post-cured at 85° C. for an additional 15 hr. Tensile properties were measured using an Instron 5581 Testing System. For each sample, a minimum of 6 specimens were tested. 10-30% improvement in both tensile strength and modulus was achieved using this method for a very low weight % of CNFs and CNTs. The results are shown in FIG. 14. CNTs were also shown to improve the curing conversion of epoxy resin at low temperatures. Especially, surface functionalization of the CNTs with amine groups showed a significant improvement in room temperature conversion. The results are shown in FIGS. 15A and 15B. It can be seen that for the same cure time, the functionalized-CNT/epoxy samples had higher resin conversion than the corresponding pristine CNT/epoxy samples. Adding 1 wt % PEI grafted CNTs more than doubled the conversion from 9% to 20% at 25° C. This is a significant increase from the perspective of low temperature manufacturing processes like vacuum assisted resin transfer molding.

EXAMPLE 2

CNF Reinforced Glass Fiber/Vinylester Composites Manufactured by VARTM

Figure 16:
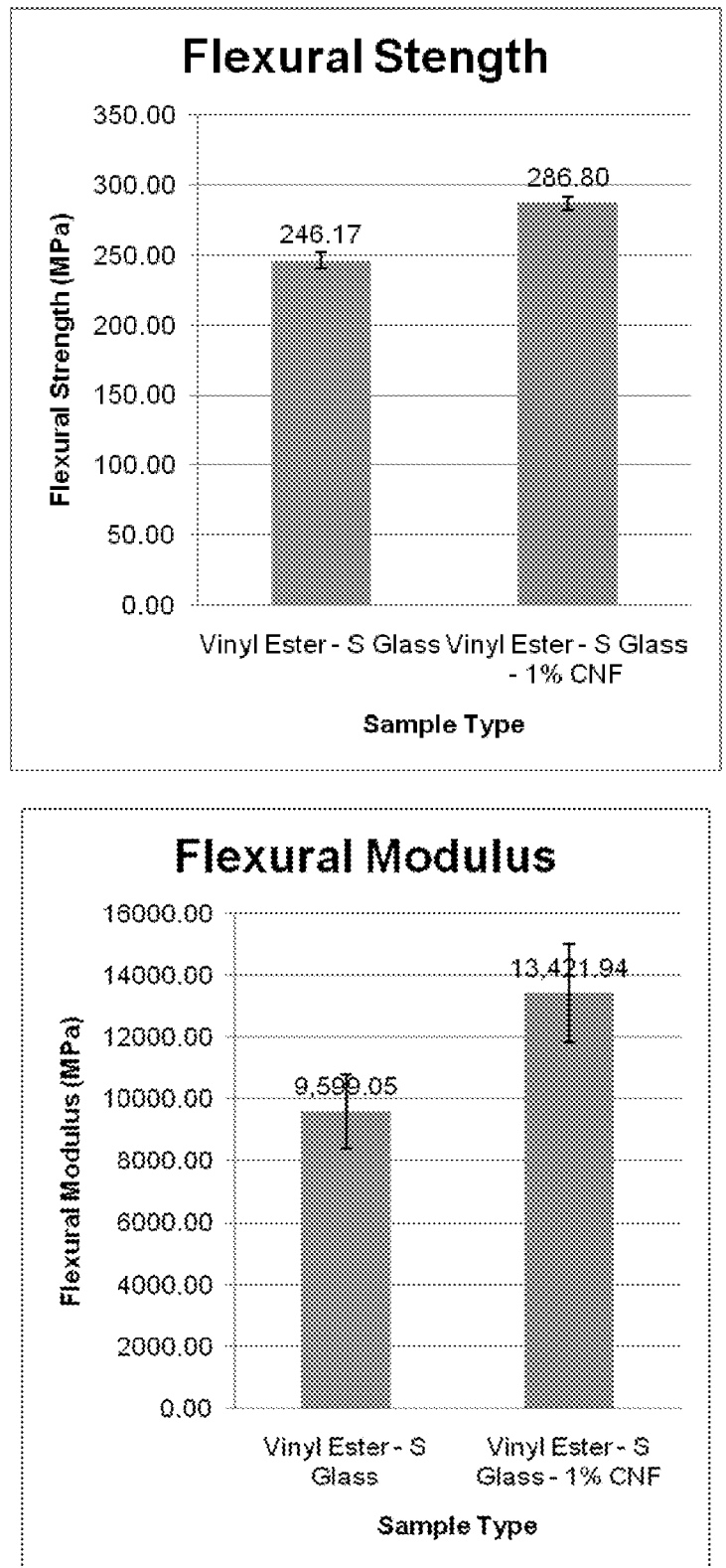
FIG. 16 graphically illustrates flexural stress and modulus improvement of Vinyl Ester/Winstrand composite by incorporation of CNFs (1 wt %) as reinforcing agent.

A solution of CNF (PR 24-XT-LHT-OX from Applied Science Inc.) dispersed to a 0.2% by weight ratio in acetone was sonicated for 30 min, and then sprayed onto both sides of each glass fiber mat (Owens Corning WindStrand™) by our vacuum-assisted spray technique. The mats were then placed in a fume hood for solvent evaporation until the weight of the fiber mats did not decrease with time. The amount of CNF was determined by the weight difference of the fiber mat before and after spraying. Vacuum assisted resin transfer molding (VARTM) was used to impregnate the fiber preforms. Seven layers of mats with pre-incorporated CNF were sealed in a vacuum bag. The inlet tube was clamped and the outlet tube was connected to a resin trap which was connected to a vacuum pump. Before mold filling, vacuum was applied to evacuate the mold and achieve a vacuum pressure of 30 mm Hg. A vinylester resin (DERAKANE 601-200) from Ashland Chemical Chemicals with cobalt naphthenate (1 wt. %) as the promoter, diethyl acetoacetamide (DEAA) as the accelerator (0.05), 2-4-pentanedione (2,4-P) as the retarder (0.15), t-butyl catechol (TBC) as the inhibitor 2.5 wt. %), and methyl ethyl ketone peroxide (MEKP) under the trade name Norac HDP (1.3 wt. %) as the initiator was degassed in a vacuum chamber for 10 min, and then introduced into the fiber preforms. After the mold was fully filled, the inlet and outlet pipes were clamped to maintain the vacuum pressure in the mold. All samples were cured at room temperature (~25° C.) for 12 hr, and post-cured at 100° C. for an additional 2.5 hr. Flexural properties were measured using an Instron 5581 Testing System according to ASTM D790-03. The support span for the 3-point bending tests was 50.8 mm. For each sample, a minimum of 6 specimens were tested. As seen in FIG. 16, the flexural modulus was improved by 40% and the flexural strength of the composites was improved by 17%. Adding CNFs to the vinyl ester resin also improved the curing conversion of the resin significantly at room temperature. While the pure vinyl ester resin had a conversion of about 61% at room temperature, adding 1.5 wt. % of CNFs improved the conversion to 76%. The results are tabulated in Table 2 below.

TABLE 2

Conversion values of vinyl ester and its nanocomposites at 25° C. after isothermal reaction for 10 hours

| Sample | Conversion at 25° C. after 10 hours |
|---|---|
| Pure VER | 0.61 |
| VER/0.2 wt % CNF | 0.62 |
| VER/0.5 wt % CNF | 0.68 |
| VER/1.0 wt % CNF | 0.67 |
| VER/1.5 wt % CNF | 0.76 |

EXAMPLE 3

Figure 17A:
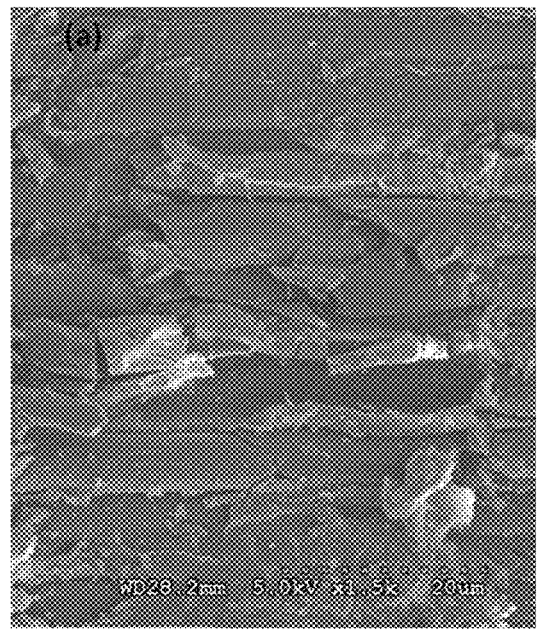
FIG. 17A photographically illustrates a sand blasted composite surface of a carbon/epoxy composite.
Figure 17B:
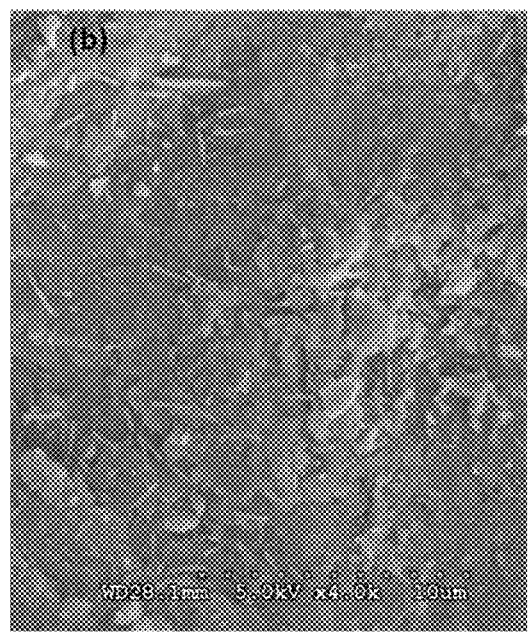
FIG. 17B photographically illustrates a sand blasted composite surface of a CNF nanopaper reinforced carbon/epoxy composite.

CNF Nanopaper Reinforced Carbon Fiber/Epoxy Composites Manufactured by Compression Molding of Prepregs A solution of CNF (PR 24-XT-LHT-OX from Applied Science Inc.) dispersed to a 0.2% by weight ratio in acetone was sonicated for 30 min, and then sprayed onto a Teflon film, then dried at 100° C. in a vacuum oven for 1 hr. The subsequent nanopaper was removed from the Teflon film resulting in a free standing film with a thickness of 100 to 150 m. This film was then cut to the desired geometry and placed on top of a Hexcel® IM7-G/8552 high performance epoxy/carbon fiber (unidirectional) plies. The prepreg plies were then placed in a fume hood for solvent evaporation until the weight of the plies did not further decrease with time. The amount of CNF was determined by the weight difference of the prepreg plies before and after spraying. The composite panels were manufactured by a match-mold compression molding process using a total of 12 plies per composite panel. The panels were cured by first applying full vacuum to the mold, and applying 7 bar gauge pressure to the mold by means of a heated mechanical press. The mold was heated at 1-3° C./min to 110° C. and held at this temperature for 60 min. The mold was then subsequently heated at 1-3° C. to 180° C. and held at this temperature for an additional 120 min. After this time, the mold was then cooled at 2-5° C./min. Pressure was released when the mold reached 60° C. or below. The composite panels were tested for abrasion resistance by exposing the composite panels to the sand blast for 10 min. The portion of the composite which had no nanoparticle film showed substantial surface wear, however, the portion of the composite panel protected by the CNF nanopaper showed resistance to erosion caused by the sand blast as observed in FIGS. 17A and 17B.

EXAMPLE 4

Figure 18:
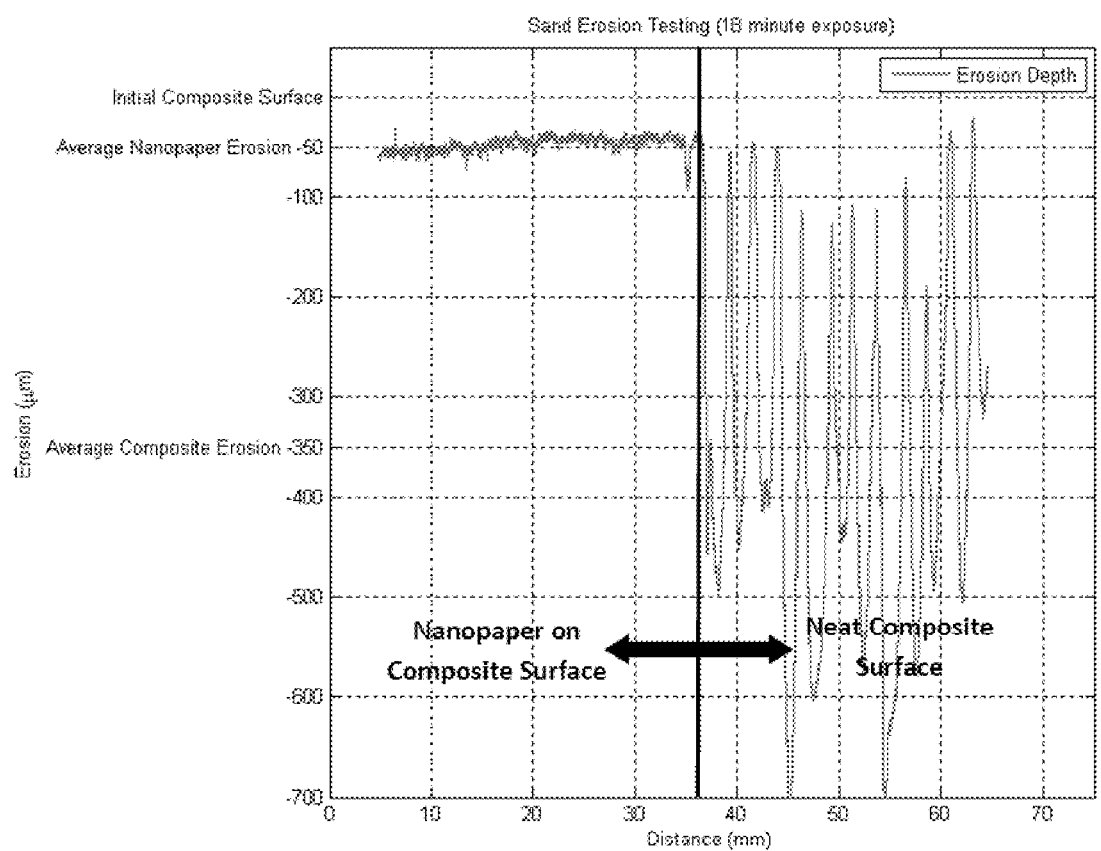
FIG. 18 graphically illustrates sand erosion test results for neat CNF nanopaper on glass reinforced epoxy composite surface for an 18 minute exposure time.
Figure 19:
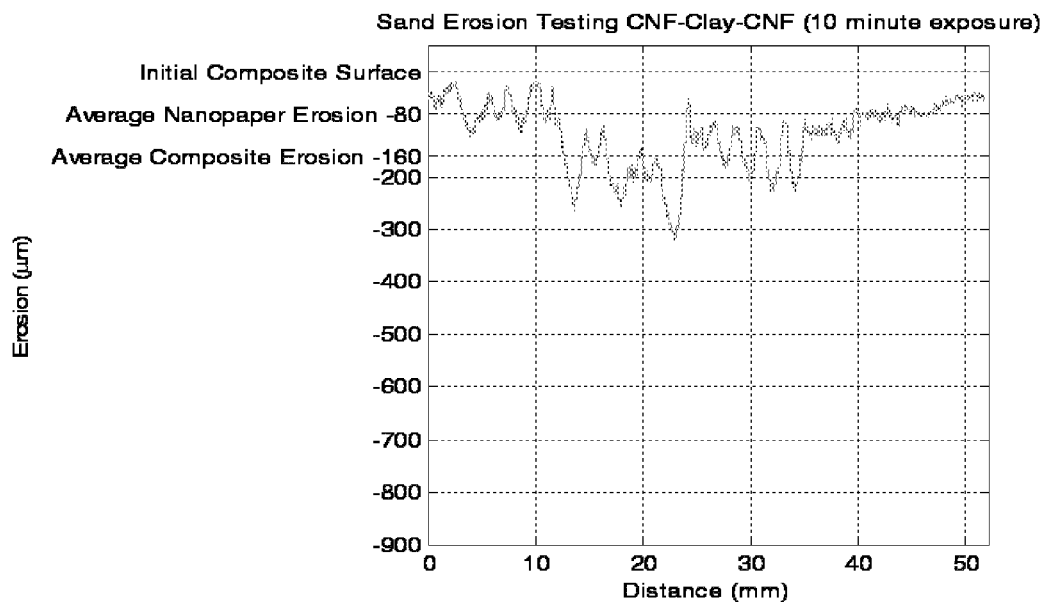
FIG. 19 graphically illustrates sand erosion test results for CNF-Nanoclay-CNF multilayer nanopaper on glass reinforced epoxy composite surface for a 10 minute exposure time.
Figure 20:
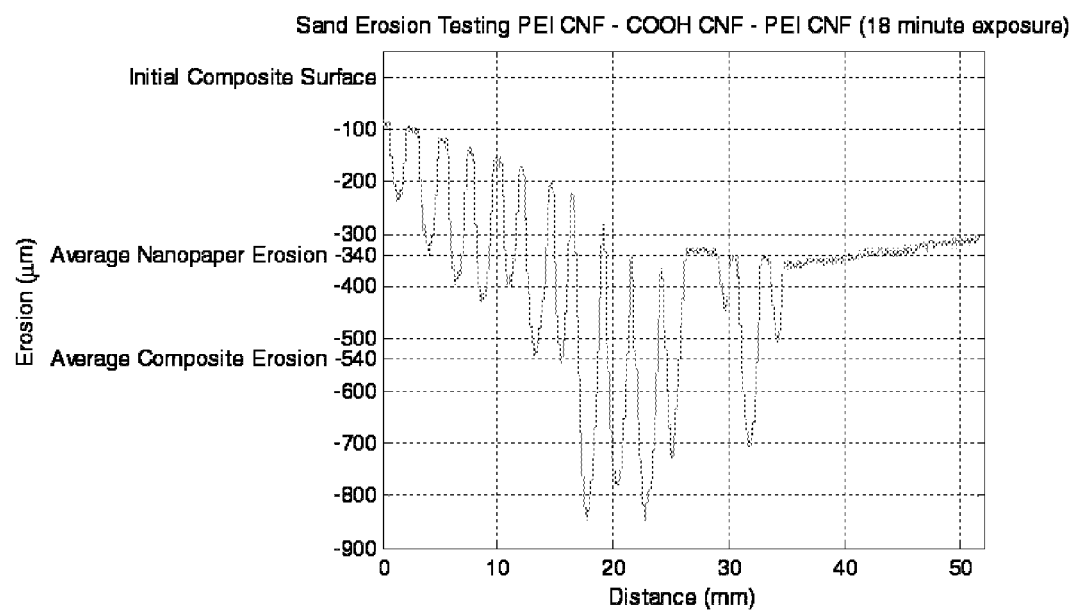
FIG. 20 graphically illustrates sand erosion test results for CNF-PEI/CNF-COOH/CNF-PEI multilayer nanopaper on glass reinforced epoxy composite surface for an 18 minute exposure time.
Figure 21A:
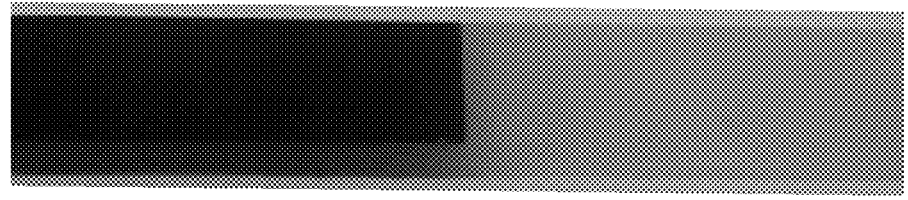
FIG. 21A is a photograph showing sand erosion results of an untested composite.
Figure 21B:
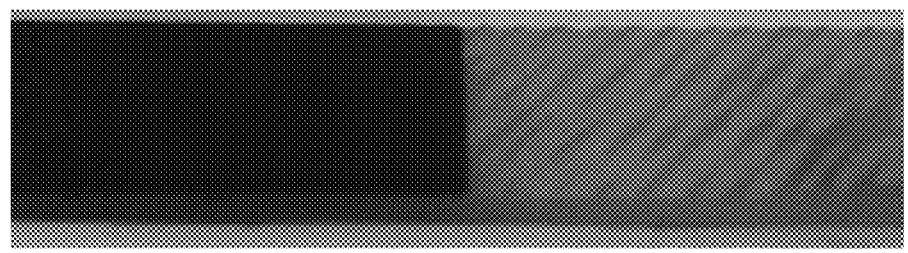
FIG. 21B is a photograph showing sand erosion results of erosion surface for CNF-PEI/CNF-COOH/CNF-PEI protected and non-protected composite after 10 minuntes of sand erosion.

Surface Modified CNF/Nanoclay/MWNT Nanopaper Reinforced Glass Fiber/Epoxy Composites Manufactured by VARTM Wind grade epoxy MGS L135 from Hexion Inc. was used as the polymer resin, while HiperTex™ glass fiber from Owens Corning was used as the long fiber reinforcement. CNF (PR 24-XT-LHT-OX from Applied Science Inc.), Nanoclay (Southern Clay) and MWNTs (from Ovation Polymers) were used as the nanoparticles. Several different surface modifications/grafting were used to change the surface chemistries of the nanoparticles. These surface chemistries helped in improving the intra and inter-layer electrostatic interactions in the nanopaper. The nanopaper itself can be made in two different techniques, the VAST technique and the suction filtration technique. The nanopapers were placed on the bottom of the mold in the VARTM setup and 5 layers of HiperTex glass fiber mats were placed on top of the nanopapers. The mold was sealed and the air inside the reinforcement was removed using a vacuum pump operating at 30 Torr. The resin and curing agent were then mixed, degassed and introduced into the mold. Once the resin saturated the reinforcement, the composite was left to cure at room temperature for 24 hours and post cured at an elevated temperature of 80° C. for 15 hours before being de-molded. The composite was then cut into strips of ½ "×4" to test for abrasion resistance. An industrial sand blast cabinet was used to test the abrasion resistance of the composite. Silicon dioxide was used as the grit material and was sprayed using a spray gun at a high pressure of 80 psi. This was carried out for varying times of 5, 10 and 18 minutes to observe the effect of time exposure on the abrasion resistance of the composite. The results are shown in FIG. 18, FIG. 19 and FIG. 20. After a specified exposure time, it was shown that unmodified CNF paper increased the abrasion resistance of the composite by about 7 times, CNF/Nanoclay/CNF multilayered nanopaper increased the abrasion resistance by 100% (10 minutes) and PEI-CNF/COOH-CNF/PEI-CNF multilayered nanopaper increased the abrasion resistance by over 160% (after 18 minutes). FIGS. 21A and 21B show composite samples before and after the sand erosion test.

Table 3 lists the selected property enhancement on different polymer resins (epoxy, vinylester, unsaturated polyester) and different nanoparticles (CNFs, CNTs, nanoclay) in terms of tensile strength, tensile modulus, flexural strength, flexural modulus, glass transition temperature (Tg), thermal conductivity, and heat conductance.

It is found that nanoparticles enhance the performance of nanocomposites from a few percentage points up to 272% depending upon the nanoparticle loading level, resin type, and testing conditions. For example, a preliminary result indicated that 7.6 wt. % CNF filled epoxy nanocomposites increased Tg by 10%, thermal conductivity by 272%, and heat conductance by 237%. A 5 wt. % nanoclay filled epoxy nanocomposite significantly improved the flame retardance performance. From a product design and industrial application perspective, a pre-dispersed nanoparticle varnish for surface performance enhancement, a high viscosity nanoparticle paste for electronic applications, and a nanoparticle pre-bound mat for both surface and bulk performance enhancement can be made.

TABLE 3

Selected property enhancement on nanocomposites

| | Material Performance | | | | | | |
|---|---|---|---|---|---|---|---|
| | Mechanical and Structural Performance | | | | Thermal Performance | | Functional Performance |
| Nanocomposites | Tensile Strength | Tensile Modulus | Flexural Strength | Flexural Modulus | Tg | Thermal Conductivity | Heat Conductance | Other Properties |
| Epoxy + 7.6 wt % CNF (premix) | | | | | Up 10% | Up 272% | Up 237% | |
| Epoxy + 3.5 wt % CNF (premix) | Up* 17% | Up 14% | Up 20% | Up 6% | Up 8% | Up 77% | Up 24% | |
| Epoxy + 1 wt % CNF (premix) | | | Up 15% | Up 3% | | | | |
| Epoxy + 3.5 wt % CNF (prebound) | Up 18% | Up 40% | Up 70% | Up 21% | | | | |
| Epoxy + 1 wt % CNF (prebound) | | | Up 45% | Up 9% | | | | |
| Epoxy + 12 wt % CNF/CNT Paste | | | | | | | | 200 Ω/Square+ |
| Epoxy + 5 wt % Nanoclay | Up 64% @ 80° C. | Up 80% @ 80° C. | | | | | | Self-distinguish# |
| Vinyl Estert Resin + 1 wt % CNF | Up 17% | Up 40% | | | | | | |
| Unsaturated Polyester + 3.5% CNF | | | Up 66% | Up 11% | Up 9% | | | |

*Up means to compare the nanocomposite property with a control sample made from the pure resin;
UL flame retardance test is ongoing;
**Test was conducted by sand erosion;
+Surface resistance test from four probes measurement.

In addition to nano-micro particles, the substrate material can also serve as a functional part of the nanopaper. For example, glass or carbon veil can be used as a substrate for nanopaper formation and a part of formed nanopaper to reduce the material cost. As another example, rubbery polymers such as woven or non-woven thermoplastic polyurethane (TPU) can be used as a substrate for nanopaper formation and a part of formed nanopaper to provide surface scratch and erosion resistance. One result without adding any nano-micro particles is shown in FIGS. 22A, 22B and 22C.

Figure 22A:
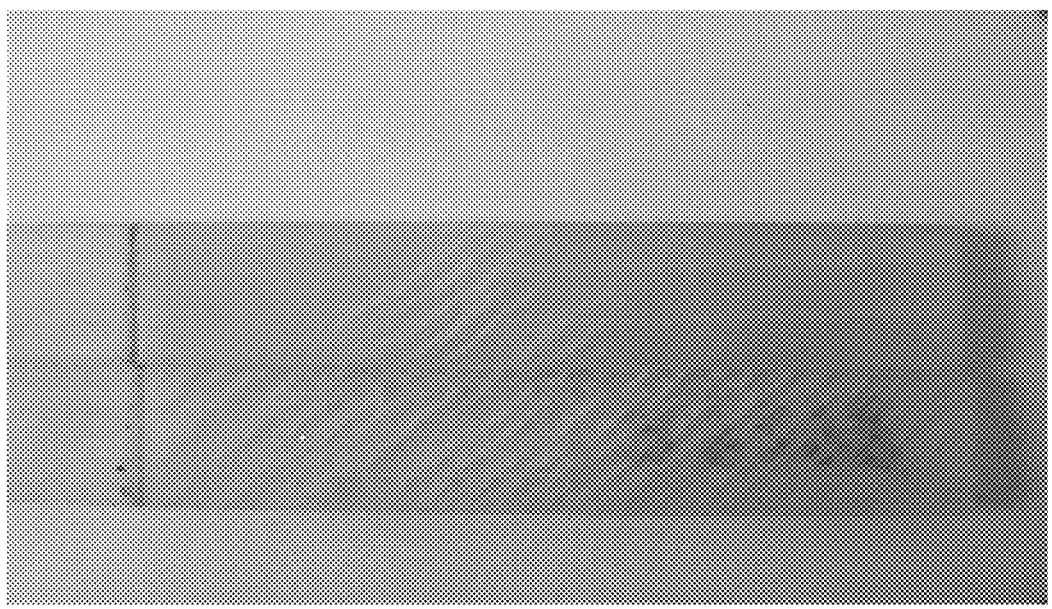
FIG. 22A is a photograph of wind epoxy/glass fiber composites after a sand erosion test.
Figure 22B:
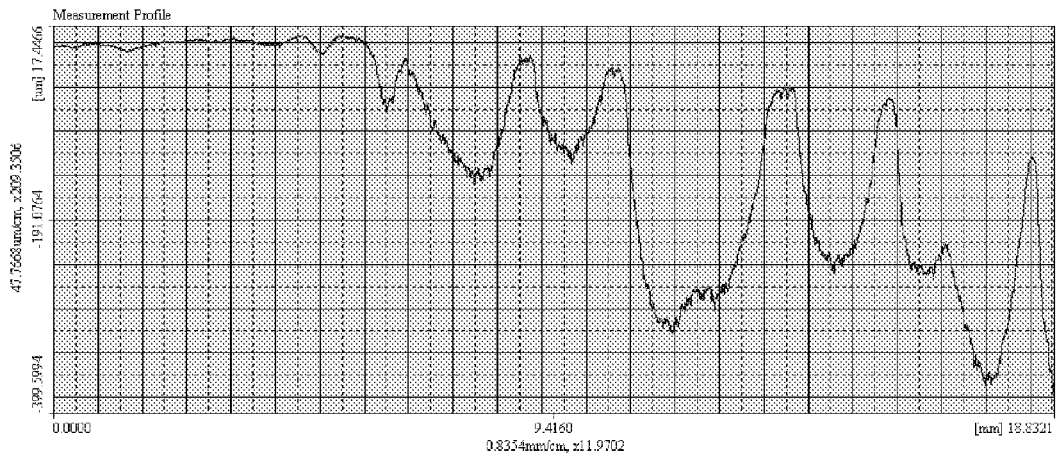
FIG. 22B graphically illustrates the surface profile of the eroded sample without TPU coating.
Figure 22C:
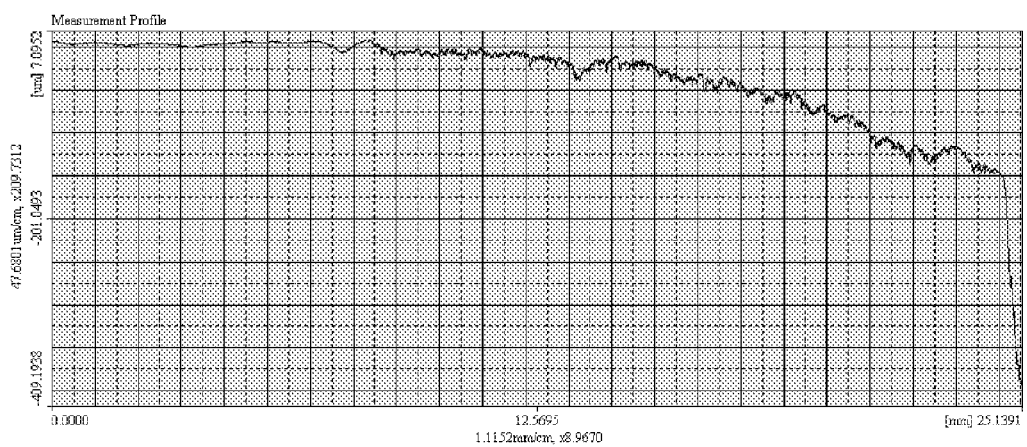
FIG. 22C graphically illustrates the surface profile of the eroded sample with TPU coating.

FIG. 22A shows the photos of wind epoxy/glass fiber composites after sand erosion test. In FIG. 22A, the thickness of the top one with one layer TPU non-woven fabric coating is 0.13 mm, and the mass loss is 81.3 mg. The mass loss of the bottom one without TPU coating is 166.9 mg. FIG. 22B shows the surface profile of the eroded sample without TPU coating and FIG. 22C shows the surface profile of eroded sample with TPU coating.

Results of solid particle erosion testing as well as surface electrical resistivity for the NanoPaper samples are shown in Table 4 and Table 5, respectively.

TABLE 4

Solid particle erosion rates for composite materials with Buckeye NanoPaper ® and/or fiber veil surface reinforcements.

| Composite Material | Erosion Rate (μm/min) | Improvement[1] (%) |
|---|---|---|
| WindStrand GF/MGS L-135 Epoxy | 19.4 | 0.0 |
| Glass Veil/MGS L-135 Epoxy | 14.6 | 24.7 |
| Carbon Veil/MGS L-135 Epoxy | 13.3 | 31.4 |
| CNF/Glass Veil/MGS L-135 Epoxy | 11 | 43.3 |
| CNF/Carbon Veil/MGS L-135 Epoxy | 8 | 58.8 |
| IM7 Carbon Fiber/8552 Epoxy | 7.5 | 61.4 |
| CNF Nanopaper/MGS L-135 Epoxy | 2.8 | 85.7 |

TABLE 5

Infused Buckeye NanoPaper ® resistivity on glass-epoxy composite surface

| Nanopaper Type | Thickness (μm) | Surface Resistivity (Ω/square) | Electrical Resistivity (Ωm) |
|---|---|---|---|
| Silver | N/A | N/A | $1.59 \times 10^{-8}$ |
| Carbon (graphite) | N/A | N/A | $5 \times 10^{-6}$ (⊥ to basal plane) |
| | | | $3 \times 10^{-3}$ (∥ to basal plane) |
| MWNT | 120 | 1.93 | $1.10 \times 10^{-3}$ |
| PEI-CNF/MWNT/PEI-CNF | 150 | 3.37 | $2.30 \times 10^{-3}$ |
| PEI-CNF/Nanoclay/PEI-CNF | 120 | 6.05 | $3.30 \times 10^{-3}$ |
| COOH-CNF(− charge) | 130 | 7.75 | $4.60 \times 10^{-3}$ |
| PEI-CNF(+ charge) | 160 | 6.81 | $4.90 \times 10^{-3}$ |
| +CNF/−CNF/+CNF* | ~150 | ~0.67 | ~$31.3 \times 10^{-3}$ |
| As-grown CNF | 230 | 9.59 | $10.1 \times 10^{-3}$ |
| Epoxy | N/A | $>10 \times 10^{13}$ | $>10 \times 10^{13}$ |

*"+ charge polyaniline/CNF"/"− charge polyaniline/CNF"/"+ charge polyaniline/CNF"

EXAMPLE 5

Synthesis of Pani-MMT Nanocomposites

The polyaniline (Pani) modified nanocomposites (MMT) with different dopants were synthesized by self-assembly during the aniline polymerization. For example, the HCl doped Pani-MMT nanocomposite was synthesized as follows: Aniline (6.7 g) was dissolved in a 1 liter 1M HCl aqueous solution in an ice bath. Then an aqueous solution of APS (13.0 g in 100 ml of de-ionized water) was added to the above mixture. The polymerization was carried out overnight (~16 hours) in the ice bath. Green solids of HCl doped Pani-MMT nanocomposites were obtained after rinsing with DI-H$_2$O three times. The preliminary experimental results indicated that the composite can contain water up to 9.3 wt. % by weight loss method.

EXAMPLE 6

Graphite Dispersion and DBSA-TBA Intercalation

In order to reach a higher degree of intercalation, graphite was dispersed firstly through a combination of physical (sonication), chemical (re-dox reaction) and electro-chemical (electrical re-dox reaction) methods.

For example, 25.50 g of graphite was added into 250 ml of fumed $H_2SO_4$ and then 25.89 g of ammonia persulfate (APS), $(NH_4)_2S_2O_8$, and 10.05 g of $KMnO_4$, to reach a 1.2 V open cycle voltage to ensure graphite dispersion. The reaction medium color was changed from dark black to dark brown, associated with $H_2SO_4$ fumes. The reaction temperature increased rapidly from room temperature to 100° C. Therefore, an ice batch was used to cool the temperature down to 0-5° C. About 50 g of DBSA was added to the system under high agitation (level-10 magnetic hot plate) for ~16 hours. Then, the system was filtrated and washed with DI-water three times. The above filter cake was suspended into 1000 ml of DI-water and about 25 g of tetra-butylammonium chloride was added for neutralization. After filtration, drying, and grinding processing, light brown color particles were obtained. The preliminary experimental results indicated that the composite can contain water up to 7.2 wt. % by weight loss method.

EXAMPLE 7

Graphite Dispersion and Ionic Liquid Intercalation

Following the above process, 2.59 g of graphite was added to 25 mls of fumed $H_2SO_4$ and then 2.56 g of ammonia persulfate (APS), $(NH_4)_2S_2O_8$, to reach a 1.2 V open cycle voltage to ensure graphite dispersion. The reaction medium color changed from dark black to dark brown, associated with $H_2SO_4$ fumes. The reaction temperature increased rapidly from room temperature to 100° C. Therefore, an ice batch was used to cool the temperature down to 0-5° C. Then, the system was filtrated and washed with DI-water three times. About 6.5 g of butyl methylimidazolium hexafluoro-phosphate ([bmim][$PF_6$]) was added to the system under high agitation (level-10 magnetic hot plate) for ~16 hours. The above system was washed and filtrated three times with DI-water. The final filter cake was dried in a vacuum oven. The preliminary experimental results indicated that the composite can contain water up to 6.8 wt. % by weight loss method.

EXAMPLE 8

Synthesis of Pani-Graphene Composites

Using the above method, the polyaniline (Pani) modified graphene composites with different associating compounds were also synthesized by self-assembly during aniline polymerization. In order to reach a high degree of intercalation, graphite was dispersed through a combination of physical (sonication), chemical (re-dox reaction) and electro-chemical (electrical re-dox reaction) methods. For example, 21.25 g of graphite was added into 250 ml of fumed $H_2SO_4$ and then 25.67 g of ammonia persulfate (APS), $(NH_4)_2S_2O_8$, to reach a 1.2 V open cycle voltage to ensure graphite dispersion. The reaction medium color changed from dark black to dark brown, associated with $H_2SO_4$ fumes. The reaction temperature increased rapidly from room temperature to 100° C. Therefore, an ice batch was used to cool the temperature down to 0-5° C. The polyaniline intercalation reaction was conducted by the following process: aniline (19.6 g) was dissolved in the above mentioned aqueous solution in an ice bath. The polymerization was carried out overnight (~16 hours) in the ice bath with stirring. Brown-green solids of $H_2SO_4$ doped Pani-Graphene composites, called "emeraldine salt (ES) composites", were obtained after rinsing with DI-$H_2O$ three times. A 1M NI-140H solution was used to "re-dope" the ES-composite for 3 days. A brown-blue un-doped Pani-graphene composite, "emeradline base (EB) composite", was obtained after filtration and drying. Besides MMT and graphene, we also successfully intercalated conducting polymer into other inorganic and organic particles, (such as Talc, and Boron nitride (BN) with a similar layer structure as graphite.), TiO2, BaTiO3, $RuO_2$, silica gel micro particles, super branched silica, PS micro beads, PMMA micro beads, PS emulsion, and PVC emulsion, etc. The preliminary experimental results indicated that the composite can contain water up to 8.8 wt. % by weight loss method.

EXAMPLE 9

Synthesis of Pani-IL-Graphene Composites

It should be mentioned that an ionic liquid (IL) was used as an associating compound during the synthesis. Room temperature ionic liquids (RTILs) are salts which are liquid around room temperature. The development of these compounds dates back to 1914, with the first preparation of ethylammonium nitrate. More recently, there has been a revival of interest in RTILs due to their potential application as environmentally-friendly and catalytically-active solvents. The main ionic liquid used in this study was butyl methylimidazolium hexafluoro-phosphate ([bmim][$PF_6$]). Hexyl and octyl methyl-imidazolium cations and the tetrafluoroborate anion were also investigated. Many different cations and anions were selected for the study. As an example, 5.65 g of above Pani-graphene composite was treated with 0.51 g of butyl methylimidazolium hexafluoro-phosphate ([bmim][$PF_6$]) to form Pani-IL-graphite composite, where the ionic liquid acted as an associating compound to connect to the polyaniline through ionic interactions. The preliminary experimental results indicated that the composite can contain water up to 9.1 wt. % by weight loss method.

EXAMPLE 10

Synthesis of Pani-Graphite Composites

Using the above mentioned method, 29.49 g of graphite was added into 2000 ml of 1M HCl and then 34.04 g of ammonia persulfate (APS), $(NH_4)_2S_2O_8$, to reach a 0.91 V open cycle voltage for graphite dispersion. 29.01 g of aniline was dissolved in the above-mentioned aqueous solution in an ice bath. The polymerization was carried out overnight (~18 hours) in the ice bath with stirring. Dark-green solids of HCl doped Pani-graphene composites, "emeraldine salt (ES) composites", were obtained after rinsing with DI-$H_2O$ three times. A 1M $NH_4OH$ solution was used to "re-dope" the ES-composite for 3 days. A dark-blue un-doped Pani-graphite composite, "emeradline base (EB) composite", was obtained after filtration and drying. The preliminary experimental results indicated that the composite can contain water up to 5.8 wt. % by weight loss method.

EXAMPLE 11

Synthesis of Pani-IL-Graphite Composites 5.03 g of above Pani-graphite composite was treated with 0.49 g of butyl methylimidazolium hexafluoro-phosphate ([bmim][$PF_6$]) to form Pani-IL-graphite composite, where the ionic liquid acted as an associating compound to connect to the polyaniline through ionic interactions. The preliminary experimental results indicated that the composite can contain water up to 6.7 wt. % by weight loss method.

EXAMPLE 12

Pani-CNF Composite Particles 0.6445 g of CNF particles were added to 120 ml of acetone. A probe sonicator was applied for 30 minutes. In order to control the temperature, an ice bath was used to remove the heat during the sonication. About 12.68 g of aniline was dissolved in 800 ml of 1M HCl. The pre-dispersed CNF/Acetone dispersion was added into the aniline/HCl solution under magnetic agitation. Then, about 14.08 g of ammonia persulfate (APS), $(NH_4)_2S_2O_8$, was added for polymerization. After 14 hours, "emeraldine salt (ES)—CNF composites" were obtained after rinsing with DI-$H_2O$ three times. A 1M $NH_4OH$ solution was used to "re-dope" the composite for 3 days. A dark-blue un-doped Pani-CNF composite, "emeradline base (EB)-CNF composite", was obtained after filtration and drying. The preliminary experimental results indicated that the composite can contain water up to 7.3 wt. % by weight loss method.

EXAMPLE 13

Pani-CNT Composite Particles 0.95 g of CNF particles was added into 100 ml of acetone. A probe sonicator was applied for 30 minutes. In order to control the temperature, an ice bath was used to remove the heat during the sonication. About 9.28 g of aniline was dissolved in 500 ml of 1M HCl. The pre-dispersed CNT/Acetone dispersion was added into the aniline/HCl solution under magnetic agitation. Then, about 11.54 g of ammonia persulfate (APS), $(NH_4)_2S_2O_8$, was added in for polymerization. After 16 hours, "emeraldine salt (ES)-CNT composites" were obtained after rinsing with DI-$H_2O$ three times. A 1M $NH_4OH$ solution was used to "re-dope" the composite for 3 days. A dark-blue un-doped Pani-CNT composite, "emeradline base (EB)-CNT composite", was obtained after filtration and drying. The preliminary experimental results indicated that the composite can contain water up to 7.7 wt. % by weight loss method.

The present invention thus produces nanopaper or nanoparticle-containing polymer composites with both mechanical and conductivity properties superior to polymer composites produced without nanoparticles, and both production cost and production rate superior to existing methods for producing nanopapers or nanoparticle reinforced polymer composites. The present invention also produces stand-alone nanopapers made of functionalized and surface-charged nanopartcles through a layer-by-layer spray process with mechanical strength and handling safety superior to existing nanopapers or nanofilms.

Comprehensive studies on the experimental details are also listed in appendixes technical papers and technical presentations.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A layer-by-layer fabrication method of sprayed nanopaper, comprising:
   suspending a plurality of polyaniline functionalized nano particles in a solvent to form a sprayable particle precursor; and
   forming one or more sprayed nanopapers by vacuum-assisted layer-by-layer spray of the sprayable particle precursor on a porous substrate;
   wherein the sprayed nanopaper comprises a layer-by-layer structure of one or more types of nano particles which are applied with alternating positive or negative surface charges and the polyaniline functionalized nano particles are treated by amine and acid containing materials to make the surface of the nano particles positively and negatively charged, respectively.

2. The method according to claim 1, wherein the nano particles comprise one or any combination selected from the group consisting of carbon nanofibers, carbon nanotubes, clays, graphites, graphenes, polymer fibers, para-aramid synthetic nanofibers, diamonds, ceramic particles, metal, metal oxide and metal alloy particles.

3. The method according to claim 1, wherein the solvent comprises one or any combination selected from the group consisting of water, ethanol, acetone and other organic solvent.

4. The method according to claim 1, wherein the sprayed nanopaper is formed by a batch spray method without a roll system.

5. The method according to claim 1, wherein the sprayed nanopaper is formed by a continuous spray method with a roll system.

6. The method according to claims 1, further comprising:
   placing the sprayed nanopaper on one side or both sides of a prepreg stack; and
   molding the prepreg stack into a nanopaper reinforced polymeric composite.

7. The method according to claims 1, further comprising:
   placing the sprayed nanopaper on one side or both sides of a fiber mat stack or a fiber preform; and
   molding the fiber mat stack or fiber preform into a nanopaper reinforced polymeric composite.

8. The method according to claims 7, wherein the sprayed nanopaper is placed on one or more surfaces of the fiber mat stack and the fiber mat stack is molded into a nanopaper reinforced polymeric composite.

* * * * *